(12) United States Patent
Cady et al.

(10) Patent No.: US 10,086,408 B2
(45) Date of Patent: Oct. 2, 2018

(54) VIBRATORY SEPARATOR SCREEN WITH MULTIPLE FRAME DESIGN

(71) Applicants: M-I L.L.C., Houston, TX (US); United Wire, Ltd., Aberdeen (GB)

(72) Inventors: Eric Cady, Florence, KY (US); Graham Alexander Robertson, Edinburgh (GB); Claire Rosaleen Galloway McLean, Musselburgh (GB); LaTosha Moore, Richmond, TX (US); Andrew Ralph, Edinburgh (GB)

(73) Assignees: M-I L.L.C., Houston, TX (US); UNITED WIRE, LTD., Aberdeen (GB)

( * ) Notice: Subject to any disclaimer, the term of this patent is extended or adjusted under 35 U.S.C. 154(b) by 1019 days.

(21) Appl. No.: 14/102,237

(22) Filed: Dec. 10, 2013

(65) Prior Publication Data

US 2014/0183143 A1    Jul. 3, 2014

Related U.S. Application Data

(63) Continuation-in-part of application No. PCT/US2013/045249, filed on Jun. 11, 2013.
(Continued)

(51) Int. Cl.
*B01D 33/03* (2006.01)
*B07B 1/46* (2006.01)
(Continued)

(52) U.S. Cl.
CPC ........ *B07B 1/4663* (2013.01); *B01D 33/0376* (2013.01); *B07B 1/04* (2013.01);
(Continued)

(58) Field of Classification Search
CPC ........... B07B 1/04; B07B 1/16; B07B 1/4609; B07B 1/4618; B07B 1/4636;
(Continued)

(56) References Cited

U.S. PATENT DOCUMENTS 4,237,000 A   12/1980   Read et al.
4,728,422 A   3/1988    Bailey
(Continued)

FOREIGN PATENT DOCUMENTS

WO    2000/25890 A1    5/2000
WO    2005/077551 A1   8/2005
WO    2013/188451 A1   12/2013

OTHER PUBLICATIONS

International Search Report & Written Opinion issued in PCT/US2013/045249 dated Sep. 25, 2013; 14 pages.
(Continued)

*Primary Examiner* — Pranav N Patel
(74) *Attorney, Agent, or Firm* — Paula Whitten-Doolin

(57) ABSTRACT

A vibratory separator includes a screen frame having an upper screen surface and a plurality of openings and a first screen insert disposed in a first opening of the plurality of openings of the screen frame, the screen insert having a screen surface positioned at a first height above the supper screen surface. The vibratory separator also includes a second screen insert disposed in a second opening of the plurality of openings of the second screen frame, wherein a screen surface of the second screen insert is positioned at a second height. The second height may be different from the first height. A method of processing fluid includes providing a flow of fluid to a vibratory separator, and flowing the fluid over a screen having a first screen insert positioned at a first height.

22 Claims, 17 Drawing Sheets

Related U.S. Application Data

(60) Provisional application No. 61/658,175, filed on Jun. 11, 2012.

(51) Int. Cl.
    *B07B 1/04*    (2006.01)
    *B07B 1/40*    (2006.01)
    *B07B 1/36*    (2006.01)

(52) U.S. Cl.
    CPC ............... *B07B 1/36* (2013.01); *B07B 1/40* (2013.01); *B07B 1/46* (2013.01); *B07B 1/4609* (2013.01); *B07B 1/4618* (2013.01)

(58) Field of Classification Search
    CPC ... B07B 1/4645; B07B 1/4663; B07B 1/4654; B07B 2201/02; B07B 2201/04; B01D 33/0375; B01D 33/54; B01D 29/445; B01D 29/46; B01D 29/72; B01D 29/05; B01D 2201/4023; B01D 2201/4038; B01D 2201/4084; B01D 2201/0415; B01D 2201/188; B01D 35/20; B01D 35/306
    See application file for complete search history.

(56) References Cited

U.S. PATENT DOCUMENTS

| | | |
|---|---|---|
| 5,137,622 A | 8/1992 | Souter |
| 5,221,008 A | 6/1993 | Derrick, Jr. et al. |
| 5,690,826 A | 11/1997 | Cravello |
| 5,720,881 A | 2/1998 | Derrick et al. |
| 5,816,413 A | 10/1998 | Boccabella et al. |
| 5,958,236 A | 9/1999 | Bakula |
| 6,029,824 A | 2/2000 | Adam |
| 6,269,953 B1 | 8/2001 | Seyffert et al. |
| 6,443,310 B1 * | 9/2002 | Schulte, Jr. ......... B01D 29/012 209/313 |
| 6,675,975 B1 | 1/2004 | Cook et al. |
| 7,011,218 B2 | 3/2006 | Colgrove et al. |
| 7,896,162 B2 | 3/2011 | Bailey |
| 2004/0074821 A1 | 4/2004 | Russell et al. |
| 2004/0099578 A1 | 5/2004 | Winkler et al. |
| 2005/0000865 A1 | 1/2005 | Schulte et al. |
| 2007/0108107 A1 | 5/2007 | Morrow |
| 2008/0314804 A1 | 12/2008 | Wojciechowski et al. |
| 2010/0276343 A1 | 11/2010 | Hukki |
| 2011/0094950 A1 | 4/2011 | Dahl |
| 2011/0253602 A1 | 10/2011 | Lipa et al. |
| 2015/0158054 A1 | 6/2015 | Cady |

OTHER PUBLICATIONS

International Search Report and Written Opinion issued for the equivalent International Patent Application No. PCT/US2014/069202 dated Mar. 26, 2015; 16 pages.

Extended European Search Report for corresponding European Application Serial No. 13803459.0, dated Jan. 7, 2016, 8 pages.

Canadian Office Action for corresponding Canadian Application No. 2,876,340, dated Jan. 14, 2016, 4 pages.

* cited by examiner

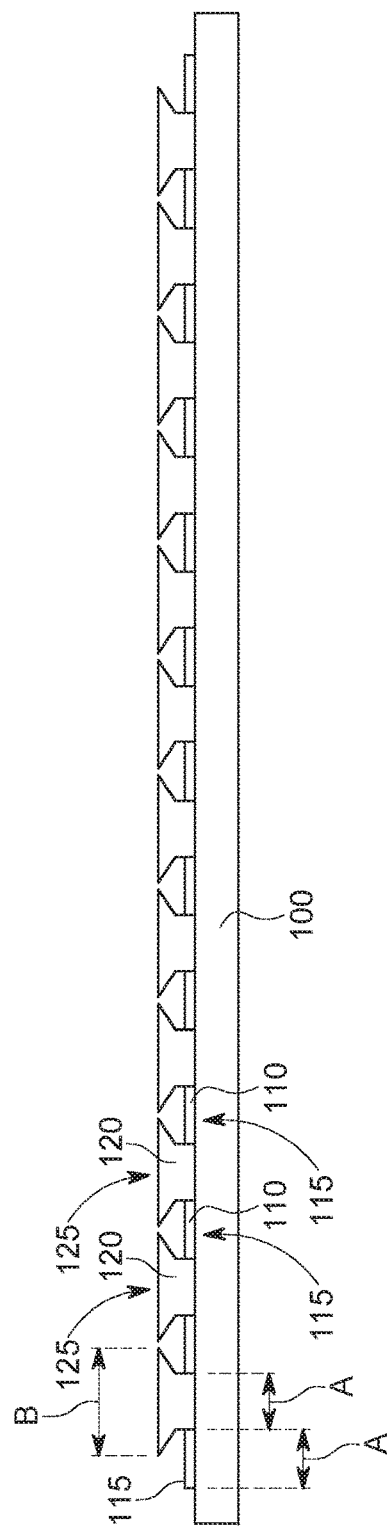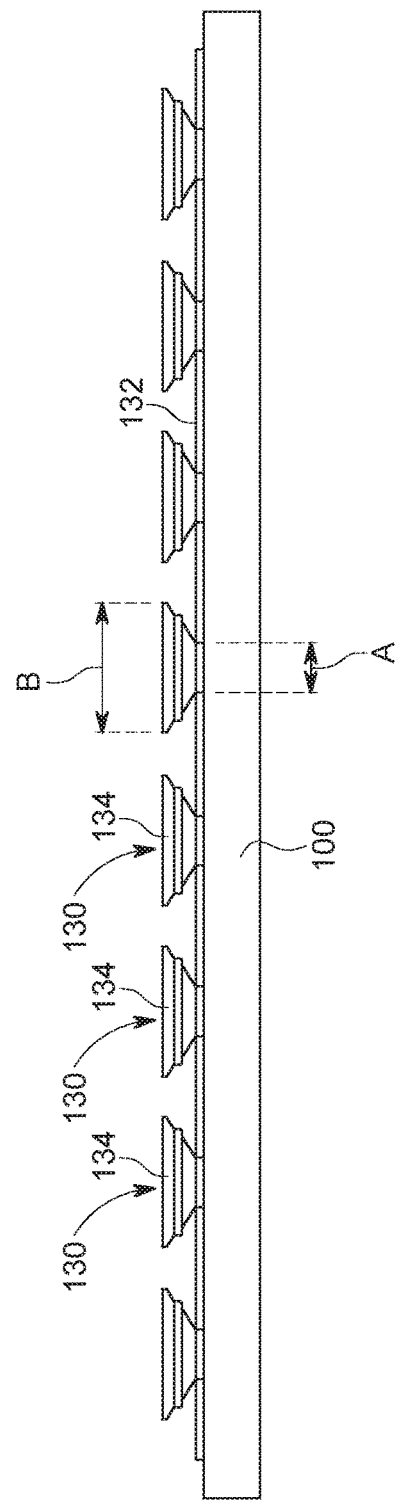

VIBRATORY SEPARATOR SCREEN WITH MULTIPLE FRAME DESIGN

CROSS-REFERENCE TO RELATED APPLICATIONS

This application claims priority to and is a continuation-in-part of International Patent Cooperation Treaty Patent Application No. PCT/US2013/045249 filed Jun. 11, 2013, and entitled, "Vibratory Separator Screen", which claims benefit of U.S. Provisional Patent Application Ser. No. 61/658,175 filed Jun. 11, 2012, and entitled, "Vibratory Separator Screen". Both of these applications are incorporated by reference herein.

BACKGROUND

Vibratory separators are used to separate solid particulates of different sizes and/or to separate solid particulate from fluids. Vibratory separators may be used in the oil and gas industry, in which they are often referred to as shale shakers. Shale shakers or vibratory separators are used to remove cuttings and other solid particulates from drilling mud returned from a wellbore. A shale shaker is a vibrating sieve-like table upon which returning used drilling mud is deposited and through which substantially cleaner drilling mud emerges. The shale shaker may be an angled table with a generally perforated filter screen bottom. Returning drilling mud is deposited at one end of the shale shaker. As the drilling mud travels toward the opposite end, the fluid falls through the perforations to a reservoir below, thereby leaving the solid particulate material behind.

Vibratory separators may also be used in the food industry, cleaning industry, waste water treatment, and others. In general, the size of a shaker screen may be pre-determined by the size of the shaker basket which is generally determined by the size of the shaker footprint. It may be desirable to maximize the amount of fluid capacity that a shaker has (i.e., the number of gallons/minute of drilling fluid/mud that a shaker can process). The higher fluid capacity a shaker has, the fewer shakers and screens may be used to maintain drilling operations. Because the size of the screen is often pre-determined, the screening area of a two dimensional pre-tensioned screen is generally also pre-determined. For example, the maximum screen area for a 2 foot by 4 foot screen is 8 square feet. In addition, the wire mesh is bonded to the screen frame so that the area of the screen where the wire mesh is bonded becomes blocked off and the effective open or non-blanked screen area is less than 8 square feet, using the example above. The wire mesh may also decrease the non-blanked area so that the effective screening area of the 8 square foot screen may be reduced by more than 50%. Despite many valuable contributions from the art, it would be beneficial to develop systems and methods that efficiently process fluids, including oil-based return drilling fluids.

BRIEF DESCRIPTION OF DRAWINGS

The drawings described herein are for illustrative purposes only of selected embodiments and not all possible implementations, and are not intended to limit the scope of the present disclosure.

FIG. 5 shows a cross-section view of a screen with alternating screen inserts installed in accordance with one or more embodiments of the present disclosure.

FIG. 6 shows a side view of a screen with screen inserts installed in accordance with one or more embodiments of the present disclosure.

Corresponding reference numerals indicate corresponding parts throughout the several views of the drawings.

DETAILED DESCRIPTION

Figure 1:
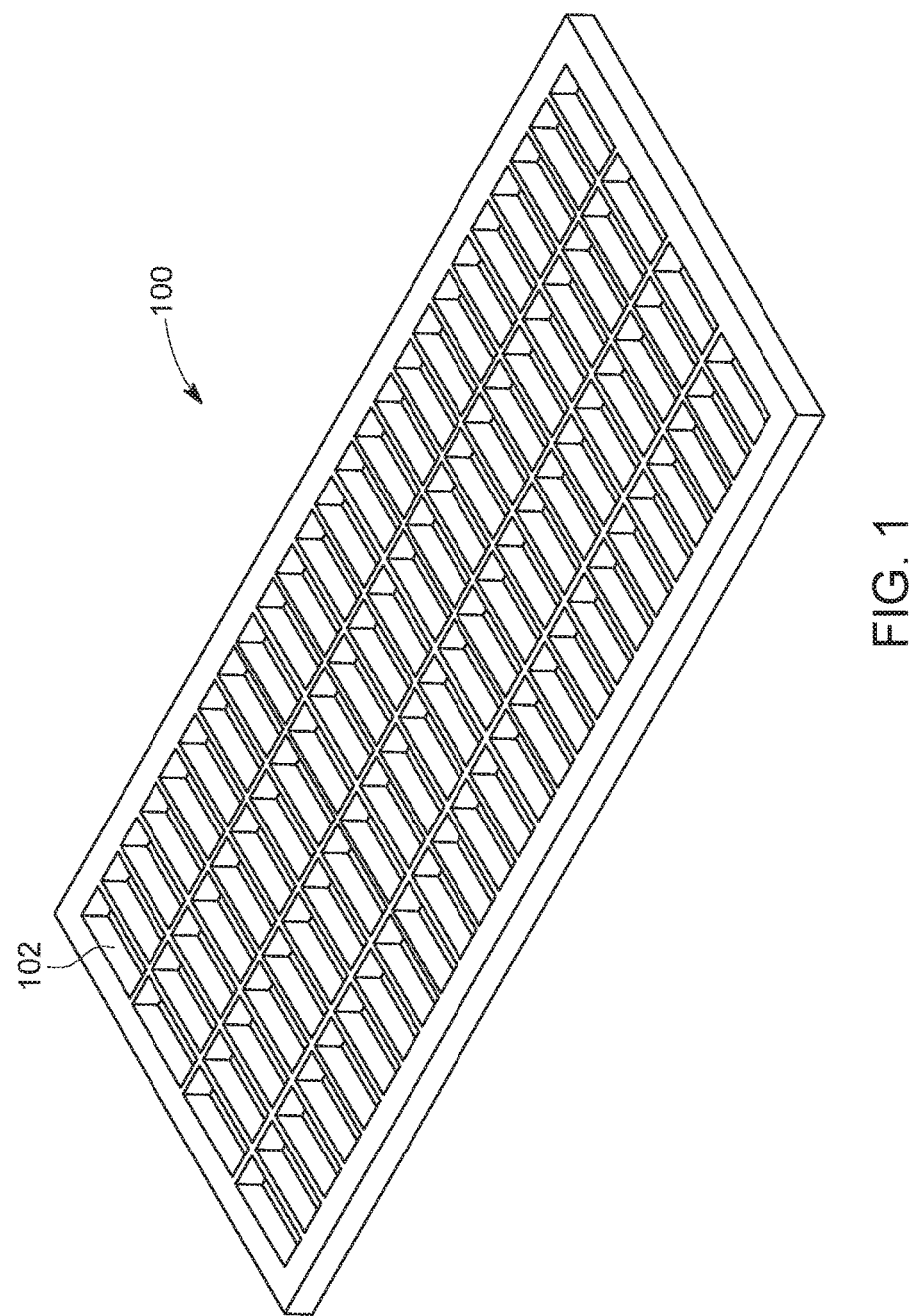
FIG. 1 shows a perspective view of a screen frame in accordance with one or more embodiments of the present disclosure.

The following is directed to various exemplary embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment. Specifically, while embodiments disclosed herein may reference shale shakers or vibratory separators used to separate cuttings from drilling fluids in oil and gas applications, one of ordinary skill in the art will appreciate that a vibratory separator (or vibratory shaker) and its component parts as disclosed herein and methods disclosed herein may be used in any industrial application. For example, vibratory separators in accordance with embodiments disclosed herein may be used in the food industry, cleaning industry, waste water treatment, and others.

Certain terms axe used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component is coupled to a second component, that connection may be through a direct connection, or through an indirect connection via other components, devices, and connections. When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, directional terms, such as "above," "below," "upper," "lower," etc., are used for convenience in referring to the accompanying drawings. In general, "above," "upper," "upward," and similar terms refer to a direction toward the earth's surface from below the surface along a borehole, and "below," "lower," "downward," and similar terms refer to a direction away from the surface along the borehole, i.e., into the borehole, but is meant for illustrative purposes, and the terms are not meant to limit the disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Embodiments disclosed herein relate generally to vibratory separators. In one aspect, embodiments disclosed herein relate to a vibratory separator including a screen frame having a first screening surface disposed above a second screening surface. In other words, a single screen frame includes a two-tier screening surface. The two-tier screening surface may be integrally formed with the screen frame or one or both of the two tiers of the screening surface may be coupled to the screen frame. In some embodiments, the first screening surface may be coupled to the second screening surface or may be coupled to the screen frame.

In another aspect, embodiments disclosed herein relate to a vibratory separator including a screen frame having an upper screen surface and a plurality openings, and a screen insert disposed in a first opening of the plurality of openings of the screen frame, the screen insert having a screen surface positioned at a first height above the upper screen surface of the screen frame.

In another aspect, embodiments disclosed herein relate to a vibratory separator including a screen frame having one or more openings, a first screen insert disposed in the one or more openings of the screen frame, wherein a screen surface of the first screen insert is positioned at a first height, a second screen insert disposed in the one or more openings of the screen frame, wherein a screen surface of the second screen insert is positioned at a second height. Specifically, the first height may be positioned above an upper screen surface of the screen frame and the second height may be positioned above the first height.

In another aspect, embodiments disclosed herein relate to a method of processing a fluid, the method including providing a flow of drilling fluid to a vibratory separator, and flowing the fluid over a screen having a first screen insert positioned at a first height. In some embodiments, the fluid may be a chilling fluid, waste water fluid, or other fluids containing particulate matter therein.

More particularly, embodiments disclosed herein relate to screens for vibratory shakers. In one aspect, embodiments disclosed herein relate to vibratory shakers with a two-tier screening surface, in other embodiments, a vibratory shaker may include a three or more tier screening surface. Such multi-tier screening surfaces may provide an increased screening area, which increases the effective processing capacity of the shaker. For instance, the screen inserts described herein may be adjusted based on a desired effective processing capacity of the shaker.

Figure 2A:
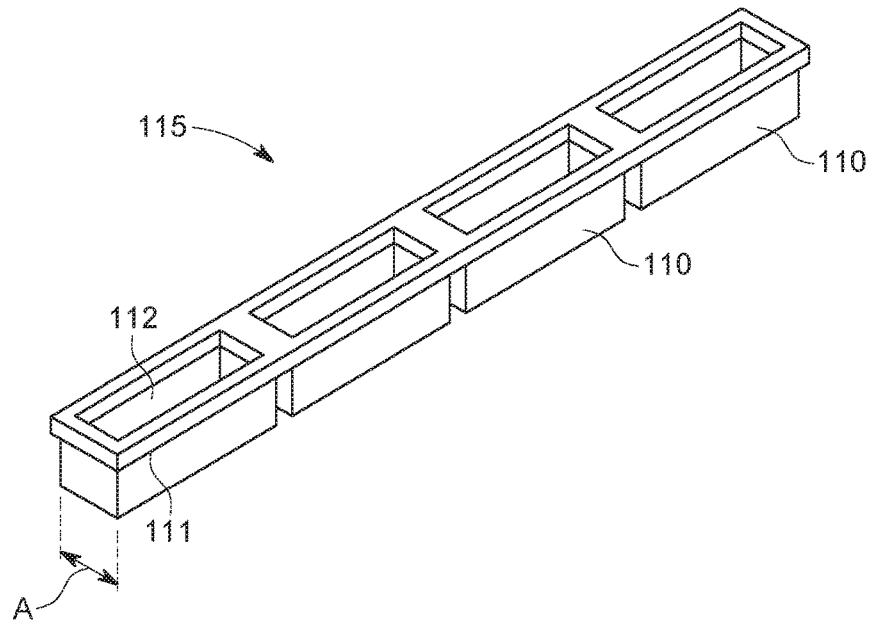
FIGS. 2A and 2B show perspective views of screen inserts in accordance with one or more embodiments of the present disclosure.
Figure 2B:
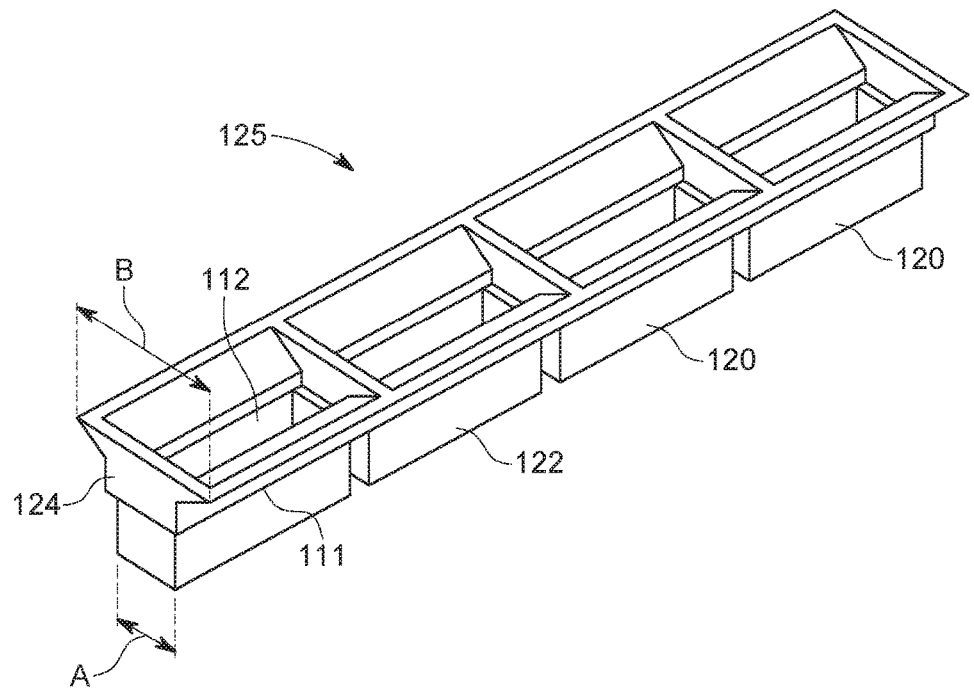
Figure 3A:
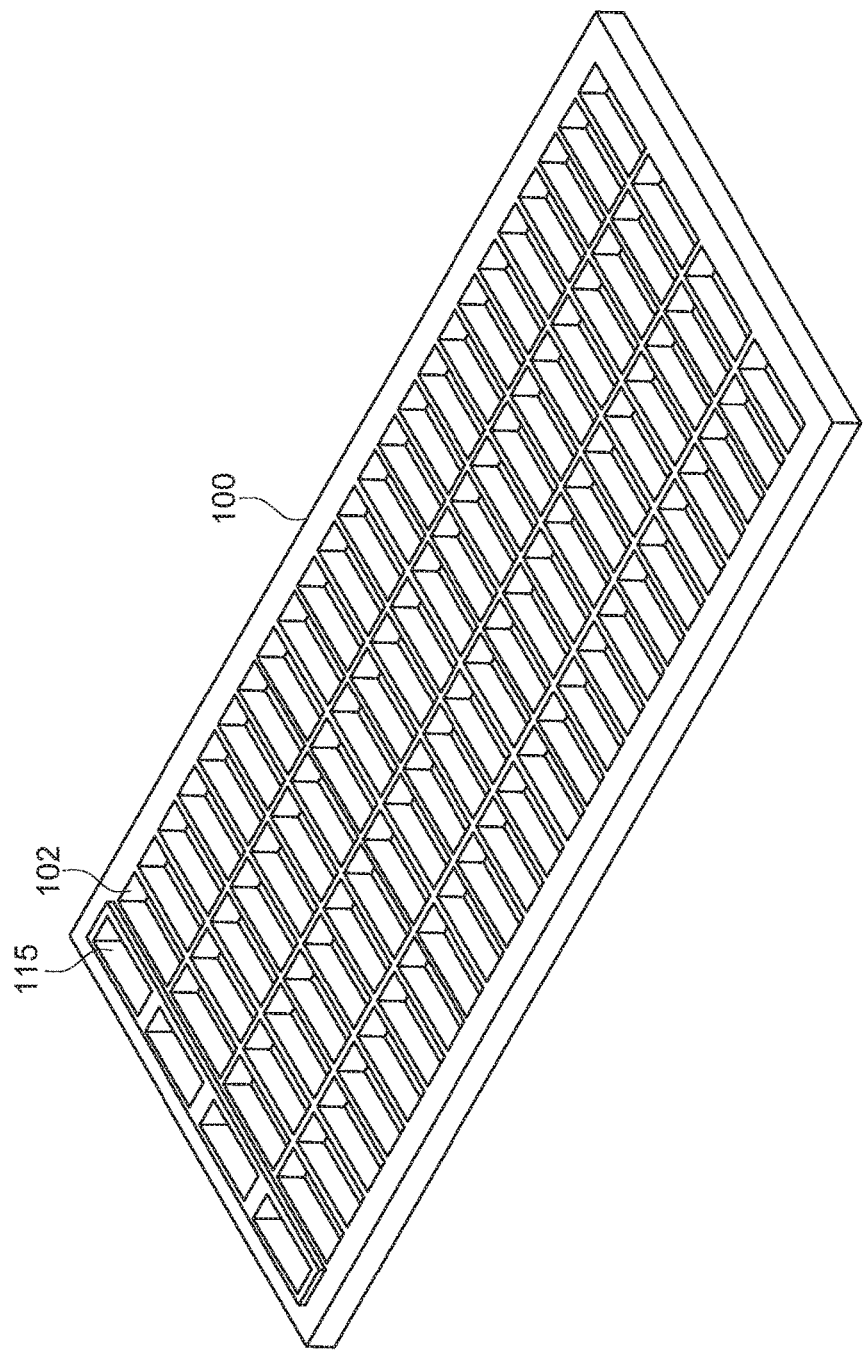
FIGS. 3A and 3B show perspective views of a screen frame with screen inserts installed in accordance with one or more embodiments of the present disclosure.
Figure 3B:
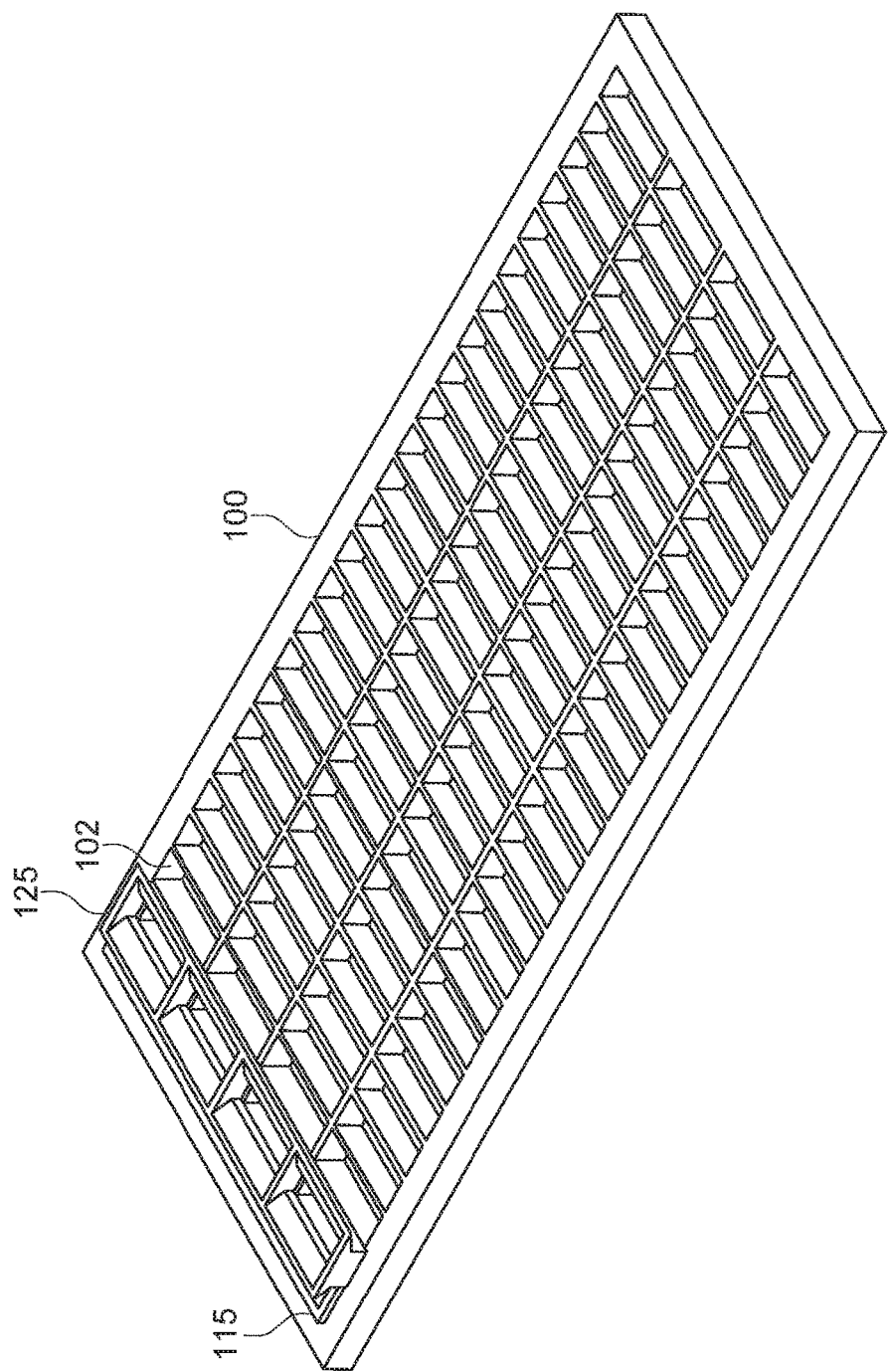

Referring initially to FIGS. 1, 2A, and 2B, a composite screen frame 100 and screen inserts 110 and 120 in accordance with one or more embodiments of the present disclosure are shown. The composite screen frame 100 is configured to be attached to a shaker frame (not shown) as will be understood by one of ordinary skill in the art. The screen frame 100 is formed having a number of individual openings or cells 102 into which first screen inserts 110 and second screen inserts 120 are configured to be inserted. Although screen frame 100 is described as a composite screen frame, one of ordinary skill in the art will appreciate that other types of screen frames may be used without departing from the scope of embodiments disclosed herein.

The first screen inserts 110 and second screen inserts 120 may be integrally molded inserts having a central opening 112 therethrough. The screen inserts 110 and 120 may have a ridge or lip 111 formed around an outer periphery of the screen insert that is configured to contact a surface of the screen frame 100. The lip 111 is configured to prevent the screen inserts 110 and 120 from falling through the cells 102 in the screen frame 100 when the screen inserts are installed. In certain embodiments, and as shown in the figures, the inserts 110 and 120 may be generally rectangular-shaped units. In other embodiments, the inserts 110 and 120 may be shaped to correspond with the shape of the openings or cells 102 in the screen frame, including but not limited to circular, triangular, and other known shapes.

The first screen inserts 110, shown in FIG. 2A, may be configured as individual screen inserts 110 which are configured to be inserted individually into cells 102 of the screen frame 100. Similarly, the second screen inserts 120, shown in FIG. 2B, may be configured as individual screen inserts 120 which are configured to be inserted individually into cells 102 of the screen frame 100. In certain embodiments, individual first screen inserts 110 may be fastened or coupled together to form a larger screen modular unit 115 (shown in FIG. 2A) which includes multiple individual first screen inserts 110. Likewise, individual second screen inserts 120 may be fastened or coupled together to form a larger screen modular unit 125 (shown in FIG. 2B) which includes multiple individual second screen inserts 120. In some embodiments, a modular unit 115 may include multiple individual first screen inserts integrally formed as a single unit.

For example, as shown in FIG. 2A, in certain embodiments, four individual first screen inserts 110 may be fastened together. In other embodiments, ten or more first screen inserts 110 may be combined to form a large modular unit of first screen inserts 110. For example, individual first screen inserts 110 may be combined such that there are between two and five individual first screen insert units installed in cells 102 of the screen frame 100. Likewise, ten or more second screen inserts 120 may be combined together to form a large modular unit of second screen units 120. Still further, modular units including both individual first screen units 110 and individual second screen units 120 may be formed.

The second screen inserts 120 are taller and about twice as wide as the first screen inserts 110. An upper portion 124 of the second screen inserts 120 may be formed having a generally Y-shaped configuration, which provides an increased width and a larger screening area, and results in the potential for higher effective fluid processing capacity than the first screen inserts 110. In other embodiments, the upper portion 124 of the second screen inserts 120 may be formed having a T-shape, U-shape, W-shape, or other shape configurations. A lower portion 122 of the second screen insert 120 has a width that corresponds with a width of the cell 102 (FIG. 1) into which the insert 120 is installed. The widened upper portion 124 thereby provides increased screening area.

The insert 120 also includes a sloped portion extending between the widened upper portion 124 and the lower portion 122. The sloped portion may ensure that fluid does not get trapped inside the insert 120 after passing through the widened upper portion 124 or a mesh screen attached to the top surface of the upper portion 124, as discussed below. As shown, the insert 120 may include two sloped portions, i.e., two sides of the insert are sloped. However, one of ordinary skill in the art will appreciate that only one side is sloped or that each side of the insert extending from the upper portion 124 to the lower portion 122 is sloped. Further, one of ordinary skill in the art will appreciate that an angle of the sloped portion(s) may vary depending on, for example, the desired screening surface area of the insert 120, the width of the upper portion 124 of the insert, the width of the lower portion 122 of the insert, the width of the a cell 102 in which the insert is inserted, the desired or expected flow rate of material to be separated, etc. The angle of the sloped portion may be between, for example, 10 degrees and 80 degrees. In some embodiments, the angle of the sloped portion may be between 30 degrees and 60 degrees. In yet other embodiments, the angle of the sloped portion may be between 10 degrees and 50 degrees or between 25 degrees and 75 degrees. One of ordinary skill in the art will appreciate that the sloped portion may be of any degrees based on a given application. The angle of the sloped portion of one side of the insert may be equal to or different than the angle of the sloped portion of another side of the same insert. Inserts in a modular unit may have the same or varying angles of sloped portions.

Furthermore, in certain embodiments, the top surfaces of the second screen inserts 120 may be positioned above the top surfaces of the first screen inserts 110. For example, in certain embodiments a distance of between about between about 1-2 inches may exist between the top surface of the second screen insert and the top surface of the first screen insert. In other embodiments, the top surfaces of the second screen inserts 120 may be positioned between about 2-5 inches above the top surfaces of the first screen inserts. As shown in FIG. 5, by positioning the second screen inserts 120 (e.g., modular unit 125) at a height above and overlapping the first screen inserts 110 (e.g., modular unit 115), the second screen insert 120 (modular unit 125) may act as a funnel to channel more fluid through the frame 100 as fluid passes through both the first and second screen inserts 110 (modular unit 115) and 120 (modular unit 125).

Methods of installing the screen inserts 110 and 120 in the screen frame 100 are described in reference to FIGS. 3A-5. The first screen inserts 110 may be installed into one or more cells 102 of the screen frame 100 and fastened in the screen frame 100. Subsequently, the second screen inserts 120 may be installed into cells 102 in the screen frame 100 which do not have first inserts 110 installed therein. For example, one or more of the second screen inserts 120 may be installed adjacent to first screen inserts 120. In certain embodiments, the first and second screen inserts 110 and 120 may be arranged in an alternating pattern along a length of the screen frame 100 (shown in FIG. 5). Other methods of installation may include installing the first screen inserts 110 initially, followed by installation of the second screen inserts 120. The first and second screen inserts 110 and 120 may be installed and secured to the screen frame 100 using any number of methods for installing and fastening the screen inserts to the frame.

For example, the screen inserts 110 and 120 may be insert-molded with the screen frame 100. Other methods include using snap lock ridges to retain the first and second screen inserts 110 and 120 to the screen frame 100. In other embodiments, screws or similar mechanical fasteners may be used. Likewise, the first and second screen inserts 110 and 120 may be glued, welded, or otherwise attached to the screen frame 100 using chemical adhesives, thermal bonding, etc. In some embodiments, the first screen inserts 110 may be molded with the screen frame 100, while the second inserts 120 may be separately coupled to the screen frame 100 using, for example, mechanical fasteners, adhesives, bonding, etc. The first screen inserts 110 may be initially formed or molded with the screen frame 100, or the first screen inserts 110 may be molded to the screen frame 100. In still other embodiments, the first and second inserts 110, 120 may molded to or with the screen frame 100.

Other attachment methods include using two-piece screen inserts (not shown) rather than single piece inserts (as shown in FIGS. 2A and 2B). The two-piece screen inserts include separable top and bottom portions that may be fastened or coupled together to form a single screen insert. The top portion of the screen insert may be installed in the top portion of a cell 102 of the screen frame 100, and the bottom portion of the screen insert may be installed in the bottom of the same cell 102 in the screen flume 100. The top and bottom portions of the two-piece screen insert may then be fastened together in the cell 102 to form a single screen insert. For example, the top and bottom portions of the screen insert may be fastened together with mechanical fasteners, adhesives, thermal bonding, etc. In addition, fastening the top and bottom portions of the screen insert within the cell 102 effectively secures the two-piece screen insert within the screen frame 100.

In still further embodiments, the first and second inserts may be configured having a slot or dovetail shape which would allow for horizontal installation (rather than vertical installation). For example, the dovetail configuration of the first and second screen inserts may correspond with a dovetail slot formed in the screen frame and into which the first and second inserts may be installed.

Figure 4:
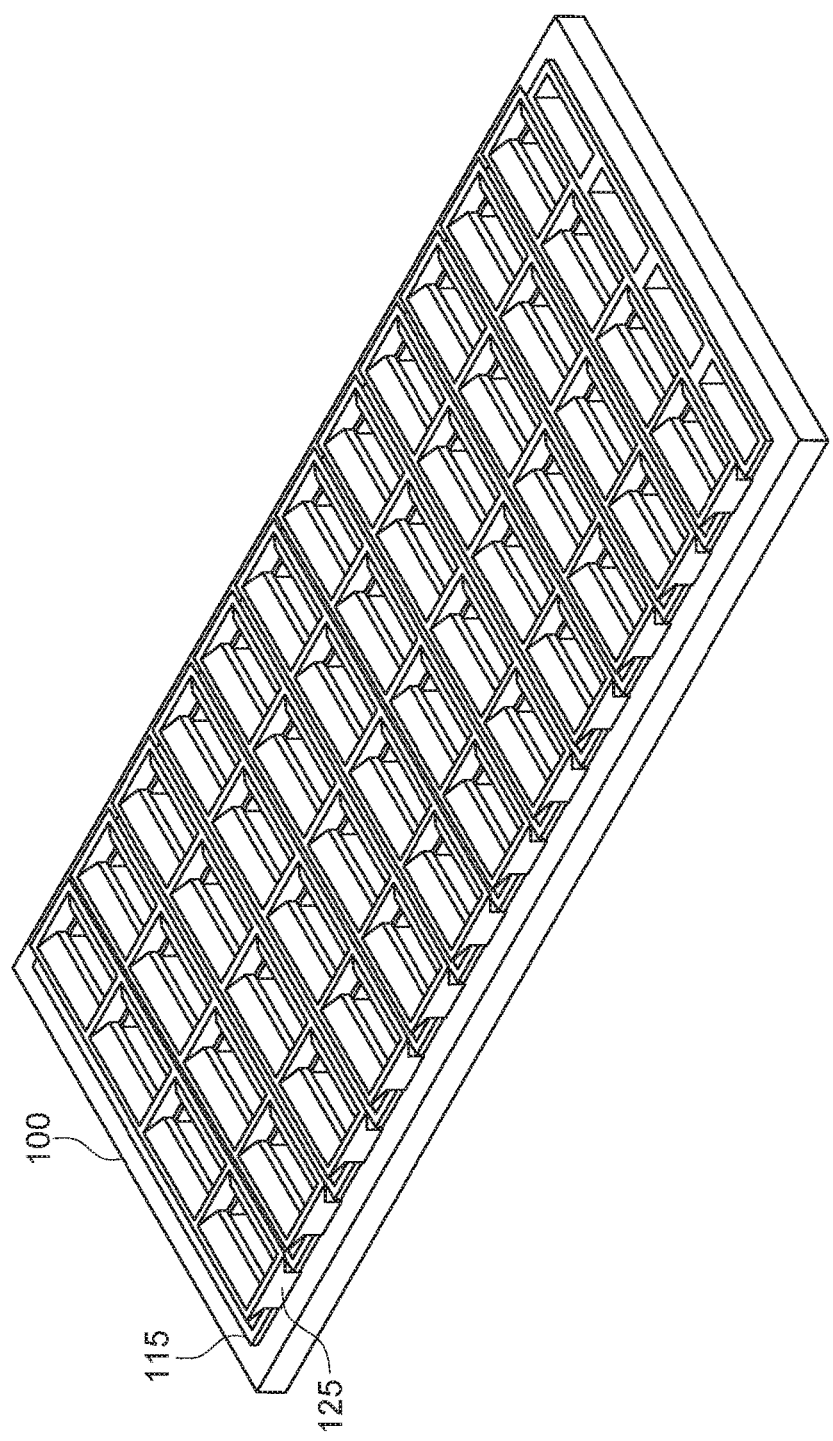
FIG. 4 shows a perspective view of a screen frame with alternating screen inserts installed in accordance with one or more embodiments of the present disclosure.

FIGS. 4 and 5 show an alternating arrangement of the first screen inserts 110 and second screen inserts 120 installed in the screen frame 100 in accordance with one or more embodiments of the present disclosure. The alternating arrangement of the first and second screen inserts 110 and 120 provides a composite screen having alternating short and tall screen inserts 110 and 120 installed therein. In other embodiments, rather than having every second row having a second screen insert 120 (i.e., taller screen insert), every third, fourth, or fifth row of cells may have the second or taller screen insert 120 installed.

Arrangement of the first and second screen inserts 110 and 120 may be adjusted based on the effective fluid flow rate. For example, when there is a higher fluid flow rate second screen inserts 120 may be installed in every other row in an alternating fashion with the first screen inserts 110 as shown in FIGS. 4 and 5. In other embodiments, also for a higher flow rate, second screen inserts 120 may be alternated with first screen inserts 110 in a portion of the screen surface nearest the fluid inlet. Thus, the screen surface may process a maximum volume of fluid flowing therethrough. For a lower flow rate, fewer second screen inserts 120 may be installed. For example, at a lower flow rate, second screen inserts 120 may be installed every third, fourth, or fifth row. In still further embodiments, for very low flow rates, only first screen inserts 110 (without second screen inserts 120) may be used to adequately process fluid flowing through the screen surface. In additional embodiments, an alternating arrangement of first and second screen inserts 110 and 120 may be used on a portion of the entire screen surface (e.g., one-quarter or one-half of the screen surface), while on remaining portions of the screen surface, only first screen inserts 110 may be used.

Although previously discussed in reference to the second inserts 120 in accordance with FIG. 2B, FIG. 5, in particular, illustrates how embodiments of the present disclosure provide an increased screening area. As shown, first screen inserts 110 have a width "A" which corresponds with a width of the cell 102 (FIG. 1) in to which the first screen inserts 110 are installed. Similarly, a base portion 122 (FIG. 2B) of second screen insert 120 has a width "A" which also corresponds with a width of the cell 102 into which the second screen inserts 120 are installed. In certain embodiments, the width "A" of the base portion 122 of the second screen insert 120 may be different than the width "A" of the first screen insert 110. Thus, in some embodiments, the first and second screen inserts 110, 120 may be configured to be installed in different cells 102 (FIG. 1) of the screen. In other words, the first screen insert 110 may be sized to fit into specific cells 102 of a screen, while the second screen insert 120 is sized to fit in other cells 102 of the screen. The upper portion 124 of the second insert 120 has a width "B" which is greater than width "A." As previously described, the width "B" may be about twice that of width "A" or even greater in certain embodiments. Therefore, by installing second inserts having an increased width in almost half of the screen frame, the overall screening area of the screen frame may be increased.

While embodiments disclosed herein describe a first screen insert 110 and a second screen insert 120, one of ordinary skill in the art will appreciate that a third screen insert (not shown) or additional screen inserts may also be used so as to provide a multi-tier screening area on a screen. For example, a third screen insert, similar to first and second inserts 110, 120 may be used in conjunction with the first and second inserts 110, 120 on a particular screen 100 (FIG. 1). In this example, a screen surface of the third screen insert is positioned at third height, the screen surface of the first screen insert is positioned at a first height, and the screen surface of the second screen insert is positioned at a second height. The first height, second height, and third height are each different heights. Thus, installation of the first, second, and third inserts in a shaker screen provides a three-tier screening area. The third screen insert may overlap one or both of the first and second inserts. One of ordinary skill in the art will appreciate that four, five, or more different screening inserts with screen surfaces positioned as varying heights may also be used.

Figure 7:
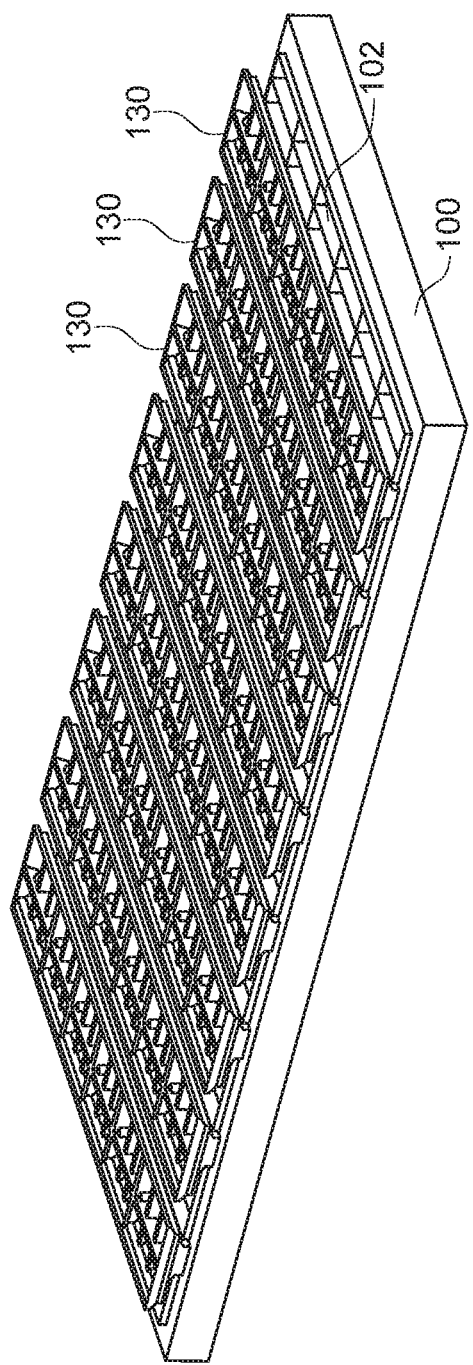
FIG. 7 shows a perspective view of a screen with a plurality of screen inserts installed in accordance with one or more embodiments of the present disclosure.
Figure 8:
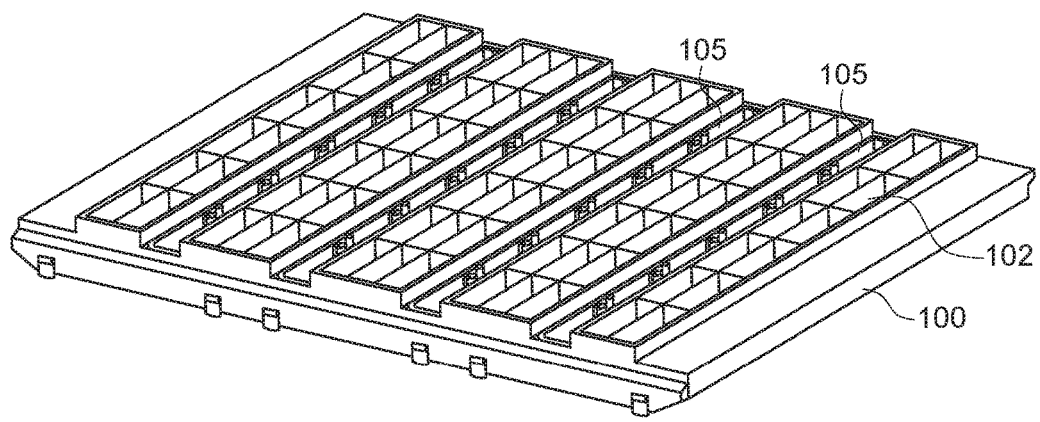
FIG. 8 shows a perspective view of a screen in accordance with one or more embodiments of the present disclosure.

In still other embodiments, a two-tier screening area may be provided by including a single set of inserts. In other words, inserts disposed in certain cells 102 of a screen and positioned at the same height as one another above the screen may be used to create two screening areas, namely, the screen surface of the screen and the screen surface of the single set of inserts. For example, as shown in FIGS. 6 and 7, screen 100 may include a plurality of openings or cells 102 through which fluid and/or particulate matter may flow. One or more screen inserts 130 may be disposed in one or more openings or cells 102 of the screen 100. In some embodiments, the screen inserts 130 may be disposed in openings formed in the screen and configured to receive the screen inserts. For example, as shown in FIG. 8, screen 100 may include a plurality of cells 102 through which sized material may flow and which form a screening surface. The screen 100 may also include a plurality of openings 105 configured to receive a screen insert (e.g. 130 in FIG. 7). As shown in FIG. 8, the screen 100 may be configured to receive a certain number of screen inserts (not shown) in openings 105. For example, FIG. 8 shows four rows of openings 105 configured to receive screen inserts disposed in between sets of cells 102 of the screen. One of ordinary skill in the art will appreciate that screens 100 with other configurations of the number of cells 102 or openings 105 for screen inserts may be used without departing from the scope of embodiments disclosed herein. Further, although the screen 100 in FIG. 8 has designated openings 105 configured to receive one or more screen inserts, one of ordinary skill in the art will appreciate that the screen 100 may not include designated openings 105 configured to receive screen inserts and instead, screen inserts may be disposed in cells 102 in any configuration selected based on a given application.

As shown, the screen 100 may include a plurality of screen inserts 130 forming a set of screen inserts. Each of the screen inserts 130 are the same size, shape, and configuration as either other. Each of the screen inserts 130 has a screen surface 134 and each screen insert 130 is positioned so that a height of each screen surface 134 of each screen insert 130 above a screen surface 132 of the screen 100 is the same. Thus, the screen surfaces 134 of the screen inserts 130 provide a first screening surface and the screen surface 132 of the screen 100 provides a second screening surface.

One of ordinary skill in the art will appreciate that the design or configuration of the screen inserts 130 may vary. For example, screen inserts 130 may include the features described above with respect to first screen inserts 110 and/or second screen inserts 120. The screen inserts 130 may have a constant width "A" or may include a taper from a first width "A" to a second width "B." In some embodiments, while the screen inserts 130 each provide a screen surface 134 at the same (equal) height above the screen surface 132 of the screen 100, the width of any portion of the screen inserts may vary. For example, the width "B" of a first insert may be different from the width "B" of a second insert. Similarly, while the screen inserts 130 each provide a screen surface 134 at the same (equal) height above the screen surface 132 of the screen 100, the length of the screen inserts may vary. For example, the length of a first insert may be different from the length of a second insert. Thus, in some embodiments, the screening area of each insert may vary, but the height of the screening area of the inserts 130 above the screen 100 is constant across the inserts 130.

The screen inserts 110, 120, 130 may be made of any material suitable for a particular application, e.g., oilfield screens, wastewater treatment screens, food processing screens, etc. For example, glass-filled polypropylene may be used in certain embodiments. In other embodiments, glass-filled nylon may be used. Steel reinforcements may also be used inside the screen inserts to add rigidity. Further, the screen inserts 110, 120, 130 formed in accordance with embodiments disclosed herein may include a single opening therethrough, two openings disposed longitudinally or laterally, three openings, four openings, or more. For example, as shown in FIG. 2A, a screen insert 110 may include a single insert with a single opening, or a modular unit 115 unit may include four inserts, each insert having a single opening. As shown in FIG. 7, a screen insert 130 may be a modular unit that includes two rows of a plurality of openings. In other embodiments, a single insert may include two rows of three openings, and a modular unit may include six inserts having two rows of three openings. Thus, while examples are shown in the picture and discussed herein, one of ordinary skill in the art will appreciate that other configuration of screen inserts may be used without departing from the scope of embodiments disclosed herein.

Additionally, a mesh screen (not shown) may be applied to the top of the screen inserts 110, 120, and 130. The mesh screen may be a high capacity mesh wire cloth design. The mesh screen may be secured to the screen inserts prior to the inserts being inserted into cells 102 of the screen frame 100. The mesh screen may be fastened to the screen inserts in a number of ways including using fasteners, adhesives, and other known attachment methods. A mesh screen may also be applied to the top of the screen 100 over cells 102 which do not include a screen insert.

In certain embodiments, the mesh screen may be fastened to cover the entire screening surface, i.e., first screen inserts 110, second screen inserts 120, and screen inserts 130 may be covered with a mesh screen. The mesh screen size (i.e., the mesh spacing) may be determined by characteristics of the particular fluid and/or particulate matter to be processed. For example, in wellbore application, the mesh screen size may be determined by characteristics of a particular wellbore. For example, depending on the wellbore characteristics, a coarse mesh screen may be used for drilling a wellbore containing, for example, mostly gumbo (e.g., soft, sticky, swelling clay or sticky shale) and a fine mesh screen may be used for drilling a wellbore containing, for example higher sand content. In other embodiments, different mesh sizes (i.e., mesh screen having different size openings may be used on different surfaces of the same screen. For example, a first mesh screen size may be used to cover the first screen inserts 110 and a second mesh screen size may be used to cover the second screen inserts 120. In other embodiments, a first mesh screen size may be used to cover an area of the screening surface nearest an inlet of the screen and a second mesh screen size may be used to cover an area of the screening surface nearest an outlet of the screen.

Still further, in certain embodiments, sealing mechanisms (not shown) may be installed between adjacent screen inserts to avoid leak paths between the screen inserts. For example, seals may first be installed in the cells 102 of the screen frame 100 prior to inserting the screen inserts 110 and 120. Thus, when the screen inserts 110, 120, and/or 130 are installed, the seals in the cells 102 may engage the screen inserts 110, 120, 130. In other embodiments, the screen inserts 110, 120, 130 may have a seal disposed around an outer periphery which engages a wall of the cells 102 when the screen inserts are installed in the cells 102 of the screen frame 100. Other sealing mechanisms for avoiding leak paths between the screen inserts and the screen frame will be known to those having ordinary skill in the art.

Figure 9:
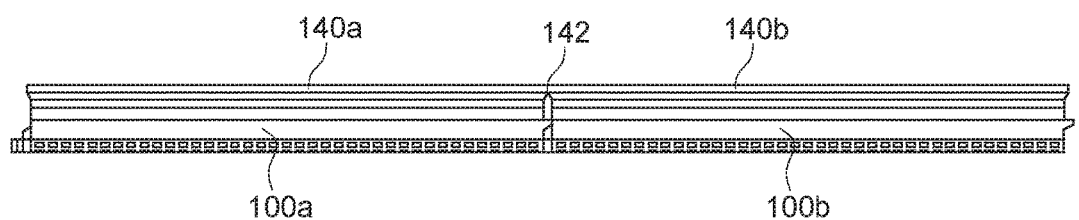
FIG. 9 is a side view of two adjacent screens, each having a screen insert in accordance with embodiments of the present disclosure.

In still other embodiments, the screen inserts (110, 120, 130) and the screen 100 may be configured such that screen inserts disposed in a first screen proximate the periphery of a first screen contact screen inserts disposed in a second screen proximate the periphery of a second screen. As shown in FIG. 9, when two or more screens 100*a*, 100*b* are placed next to each other in a vibratory separator (not shown), at least one screen insert 140*a* on the first screen 100*a* contacts (shown at 142) at least one screen insert 140*b* on the second screen 100*b* along a lengths of the screen inserts 140*a*, 140*h*. This configuration may allow solids to stay on top of the inserts 140*a*, 140*b*, as the material is flowed over the screens 100*a*, 100*b* until they are discharged off the vibratory separator. This may prevent solids or fluids from bypassing the screening surfaces of the screen 100*a*, 100*b* and/or the screen inserts 140*a*, 140*b*. In some embodiments, a seal may be formed by the contact between the screen inserts 140*a*, 140*b*. In other embodiments, a sealing element may be coupled to one or both of the screen inserts 140*a*, 140*b*, so as to provide enhanced sealing or further prevent solids from falling between the screen inserts 140*a*, 140*b*.

With reference to FIGS. 10-13, a filtering screen assembly constructed in accordance with the present teachings is illustrated and generally identified at reference numeral 210. While the filtering screen assembly 210 is generally described herein filtering drilling fluid or mud from an oil well, it will be appreciated that the filtering screen assembly 210 may be operable to filter other materials, including, materials from other types of wells.

Figure 13:
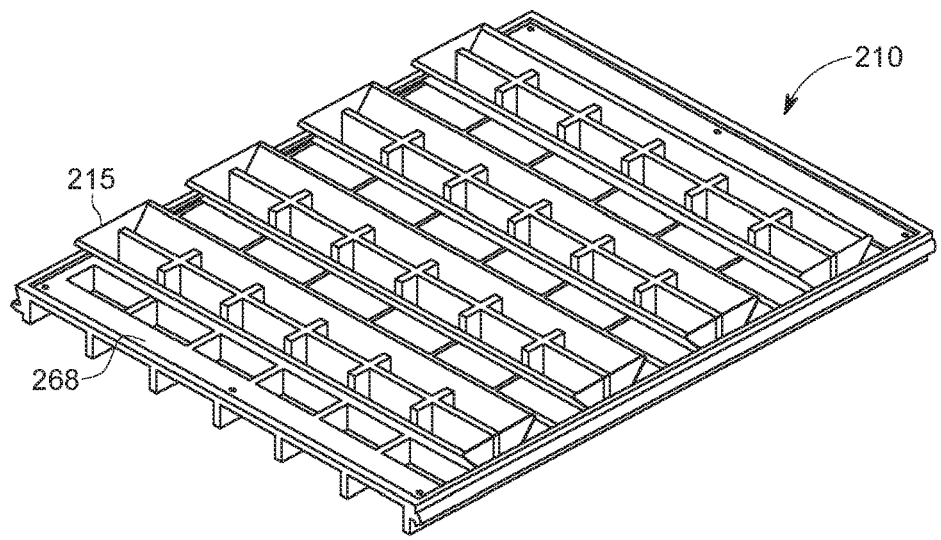
FIG. 13 is a perspective view of the filter screen assembly of FIG. 10, including a screen assembly according to the principles of the present disclosure.

The filtering screen assembly 210 includes a first screen frame 212, a second screen frame 213, and a screen assembly 215 (FIG. 13). The first screen frame 212 and the second screen frame 213 may be constructed of metal (e.g., steel, aluminum, etc.), thermoset polymeric, material, thermoplastic polymeric material, a reinforced composite material, or any other suitable material within the scope of the present teachings. Accordingly, the first screen frame 212 and the second screen frame 213 may be manufactured by three dimensional printing, injection molding, casting, extruding, machining or stamping, within the scope of the present disclosure. While the first screen frame 212 and the second screen frame 213 are generally described herein as being discrete and separable components, it will also be appreciated that the first screen frame 212 and the second screen frame 213 may be integrally formed as a monolithic construct within the scope of the present teachings.

The first screen frame 212 is configured to be attached to a shaker frame (not shown) as will be understood by one of ordinary skill in the art. The first screen frame 212 includes a plurality of openings or cells 214 extending therethrough. Each cell 214 may be defined or delineated by at least one first main rib or beam 216 and at least one second main rib or beam 218. The first main beam 216 may extend laterally between first and second sidewalls 220*a*, 220*b* of the first screen frame 212. The second main beam 218 may extend longitudinally between third and fourth sidewalls 222*a*, 222*b*. The spacing of the first and second main beams 216, 218 may be such that the cells 214 are substantially rectangular. A first upper surface defined by the first and second sidewalls 220*a*, 220*b* and by adjacent second main beams 218 has a surface area A1. The first upper surface may be planar, U-shaped (e.g., concave or convex), sinusoidal, or any other suitable configuration within the scope of the present disclosure, such that the topography of the first upper surface is optimum for the flow and treatment of fluid therethrough.

The first screen frame 212 may also include at least one minor rib or beam 224. The minor beam 224 and the first and second main beams 216, 218 may be integrally formed with the first, second, third and fourth sidewalls 220*a*, 220*b*, 222*a*, 222*b*, such that the first screen frame 212 is a monolithic construct. The minor beam 224 may extend longitudinally, and substantially parallel to the second main beam 224, such that the minor beam 224 divides each cell 214 into first and second cells 214*a*, 214*b*. In one configuration, the minor beam 224 extends through the central portion of the cell 214, such that the size of the first cell 214*a* is substantially equal to the size of the second cell 214*b*. While the minor beam 224 is shown extending longitudinally and substantially parallel to the second main beam 224, it will also be appreciated that the minor beam 224 may extend laterally and substantially parallel to the first main beam 216 within the scope of the present teachings. The width of the first and second main beams 216, 218 and the minor beam 224 may be such that the non-blanked surface area of the first upper surface of first screen frame 212 is greater than seventy-five percent of the total surface area of the first upper surface.

Figure 11:
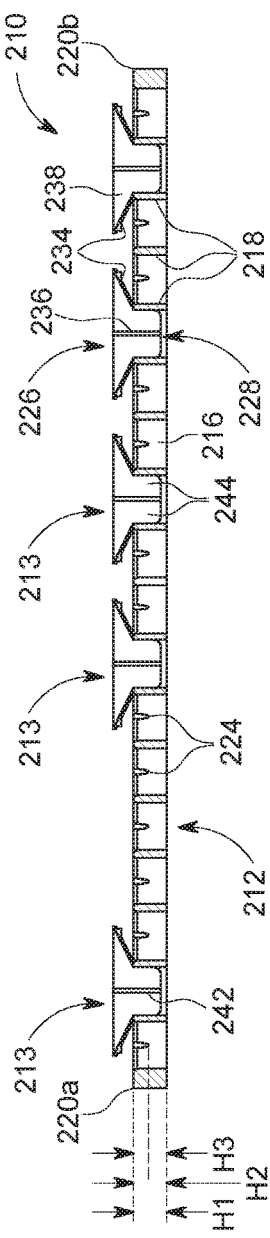
FIG. 11 is a cross-sectional view of the filter screen assembly of FIG. 10, taken through the line 12-12.

With particular reference to FIG. 11, a height H1 of the first and second main beams 216, 218 may be substantially equal to a height H2 of the first, second, third and fourth sidewalls 220*a*, 220*h*, 222*a*, 222*b*. The height H3 of the minor beam 224 may be less than the height H1 of the first and second main beams 216, 218. As illustrated, in one configuration, the height H3 of the minor beam 224 is approximately one-half the height H1 of the first and second main beams 216, 218. It will be appreciated, however, that the height H3 of the minor beam 224 may be more or less than one-half the height H1 of the first and second main beams 216, 218 within the scope of the present teachings. As will be described in more detail below, the height H3 of the minor beam 224, relative to the height H1 of the first and second main beams 216, 218 and the height H2 of the first, second, third and fourth sidewalk 220*a*, 220*b*, 222*a*, 222*b*, allows a user to more easily remove the minor beam 224 from the first screen frame 212 without damaging the first and second main beams 216, 218.

Figure 14:
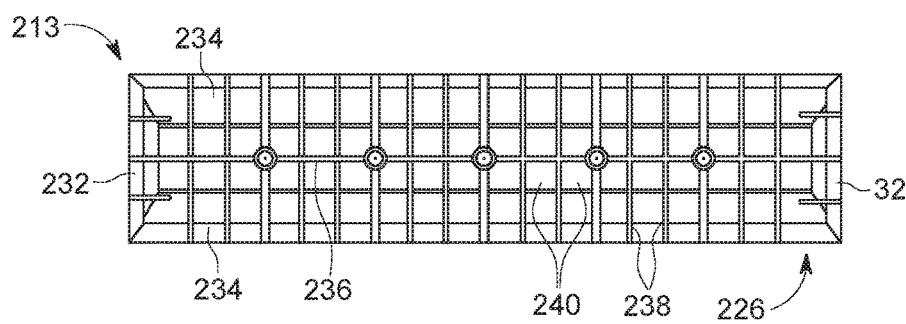
FIG. 14 is a top view of the second screen frame of FIG. 10.
Figure 15:
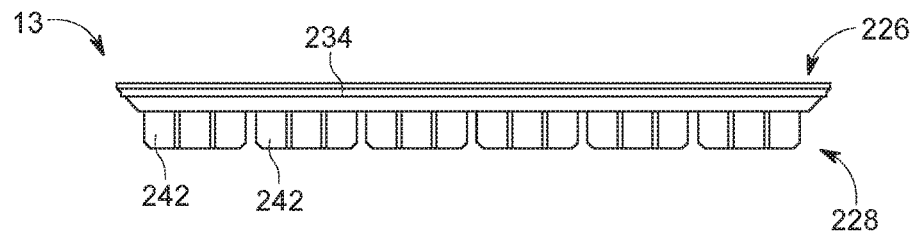
FIG. 15 is a side view of the second screen frame of FIG. 10.
Figure 16:
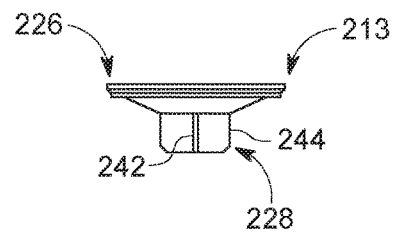
FIG. 16 is an end view of the second screen frame of FIG. 10.

The second screen frame 213 includes a frame 226 and a compression mechanism or base 228. As illustrated in FIGS. 14-16, the frame 226 may be defined by end walls 232 and sidewalls 234. The end walls 132 and the sidewalls 234 may be angled such that the frame 226 is substantially funnel shaped, including, a V-shape in the longitudinally extending direction and a V-shape in the laterally extending direction. Accordingly, a second upper surface defined by the proximal end of end walls 232 and sidewalls 234 has a surface area A2 that is greater than the first upper surface area A1. Likewise, a first lower surface defined by the distal end (adjacent the base 228) of end walls 232 and sidewalls 234 has a surface area A3 that is substantially equal to the first upper surface area A1. The second upper surface and the first lower surface may be planar, U-shaped (e.g., concave or convex), sinusoidal, or any other suitable configuration within the scope of the present disclosure, such that the topography of the second upper surface and the first lower surface are optimum for the flow and treatment of fluid therethrough.

With particular reference to FIG. 14, in one configuration the second screen frame 213 may also include at least one main beam 236 and at least one divider 238. The main beam 236 may extend between the end walls 232. The divider 238 may extend between the sidewalls 234. Accordingly, in one configuration, the main beam 236 and the divider 238 substantially define a grid of upper cells 240. The larger second upper surface area A2, as compared to smaller first upper surface area A1, helps to ensure an increased rate of penetration of drilling mud through the cells 214 and the upper cells 240. It also helps to reduce the equipment footprint of the drilling rig and allow for a finer mesh size in the screen assembly 215, to clean mud more efficiently. This, in turn, helps to reduce the mud-bill, and the screen cost per drilled foot. The reduce equipment footprint also helps to reduce the noise level, due to the use of fewer shakers.

With particular reference to FIGS. 15 and 16, the base 228 includes at least one first tongue portion 242 and at least one second tongue portion 244. The first tongue portion 242 may be integrally formed with, and extend from, the main beam 236. The width W1 of the first tongue portion 242 may be greater than a longitudinally extending distance W2 between adjacent first main beams 216. The second tongue portion 244 may be integrally formed with, and extend from, the divider 238. The width W3 of the second tongue portion 244 may be greater than a laterally extending distance W4 between adjacent second main beams 218. In one configuration, the first and second tongue portions 242, 244 define a grid of lower cells 246.

Figure 10:
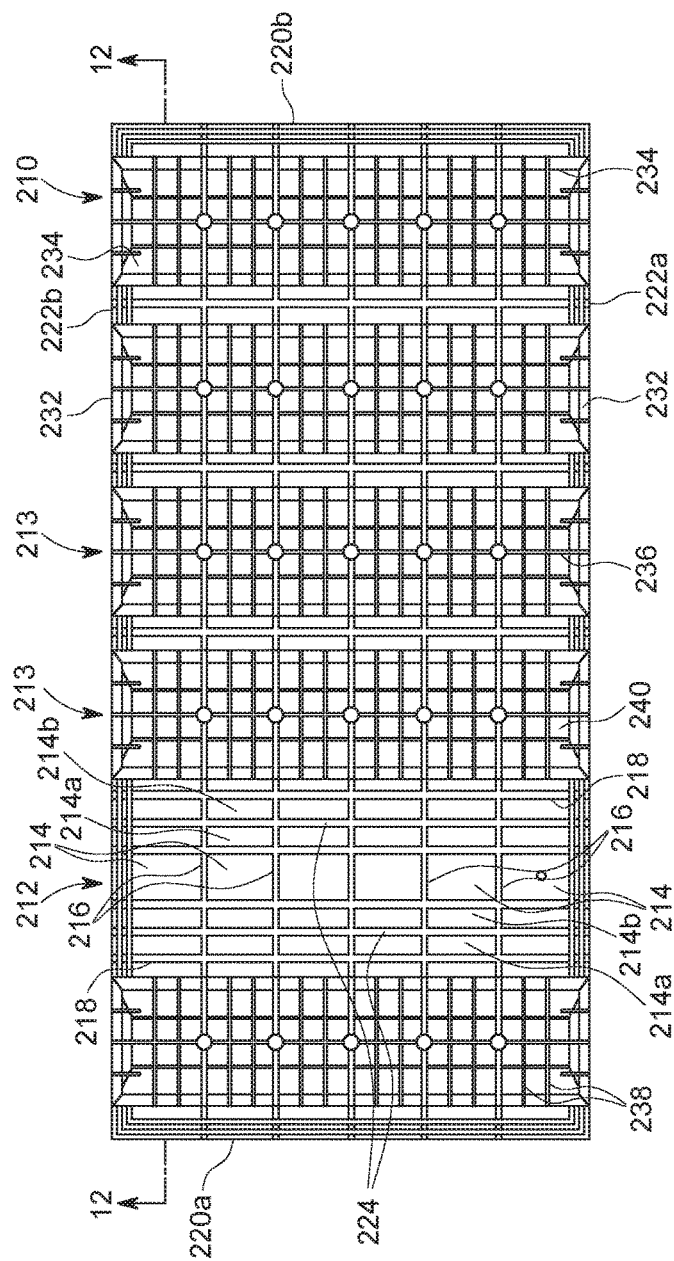
FIG. 10 is a top view of a first screen frame and a second screen frame of a filter screen assembly, according to the principles of the present disclosure.
Figure 12:
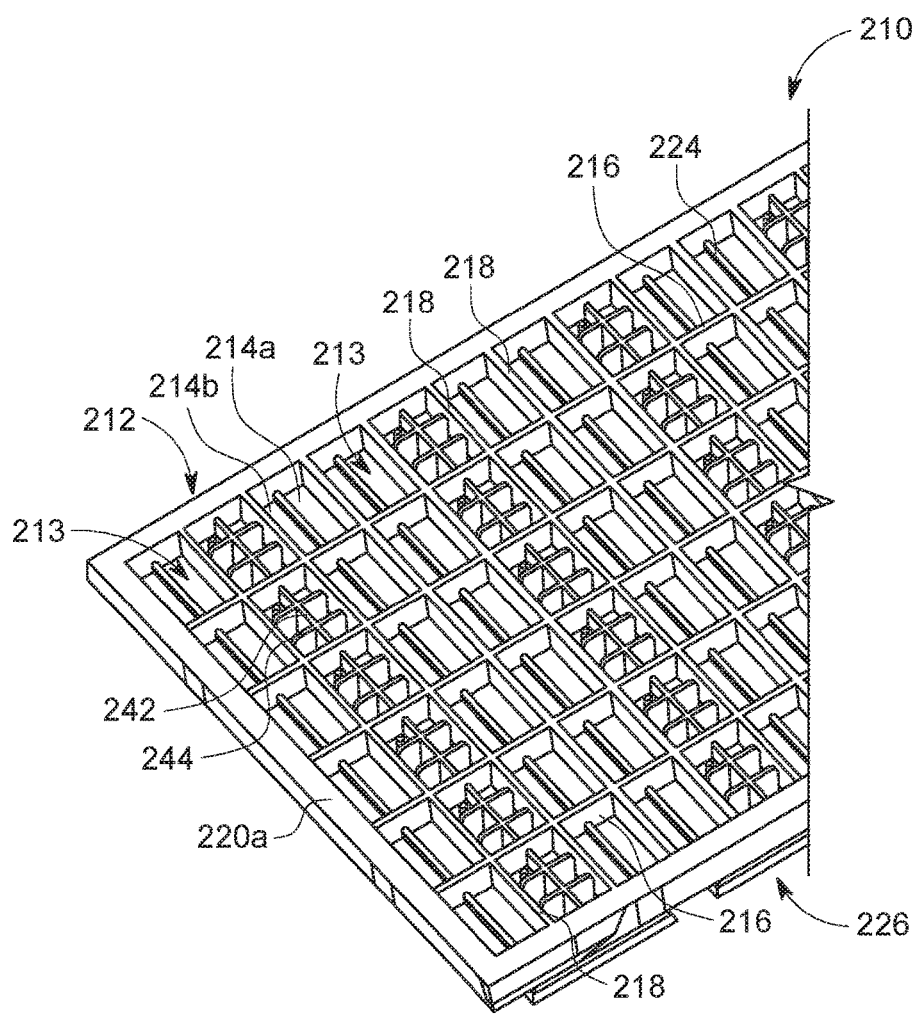
FIG. 12 is a perspective view of the bottom of the first screen frame and the second screen frame of the filter screen assembly of FIG. 10.

As illustrated in FIGS. 10-12, in an assembled configuration, the base 228 may be mounted within the cell 214, such that the first tongue portion 242 is interferingly engaged with the first main beams 216 in a compression-fit configuration, and the second tongue portion 244 is interferingly engaged with the second main beams 218 in a compression-fit configuration. It will be appreciated that mounting the base 228 in the cell 214 may include removing the minor beam 224 from the first screen frame 212. In one configuration, the base 228 is removably mounted within the cell 214, such that the second screen frame 213 can be selectively mounted to or removed from the first screen frame 212. In this way, the second screen frame 213 may be a replaceable and/or disposable component of the screen frame assembly 210, such that the first screen frame 212 can be reused with various second screen frames 213.

Figure 17:
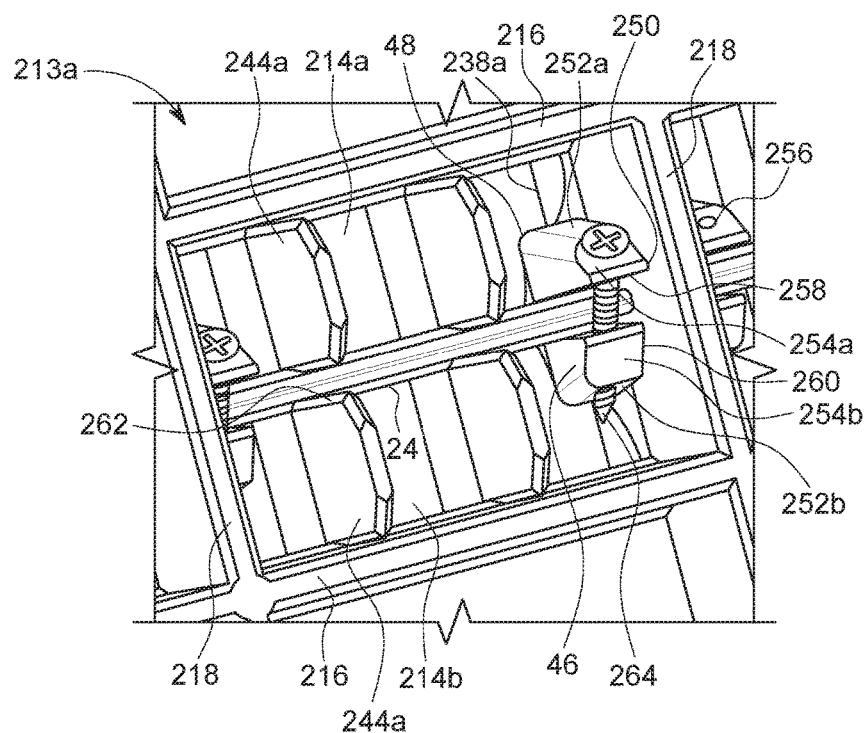
FIG. 17 a perspective view of the bottom of another configuration of a filter screen assembly, according to the principles of the present disclosure.
Figure 18:
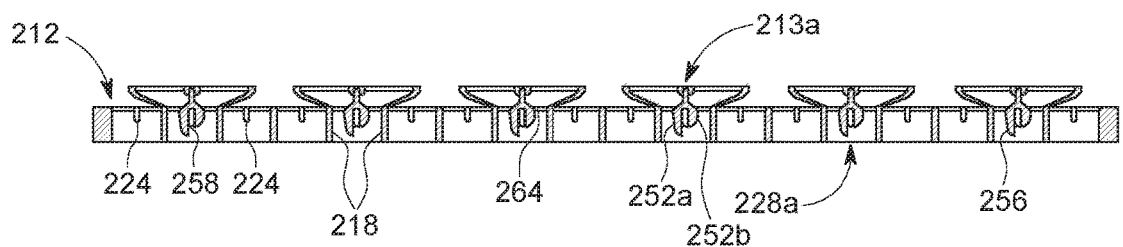
FIG. 18 is a cross sectional view of the filter screen assembly of FIG. 17.
Figure 19:
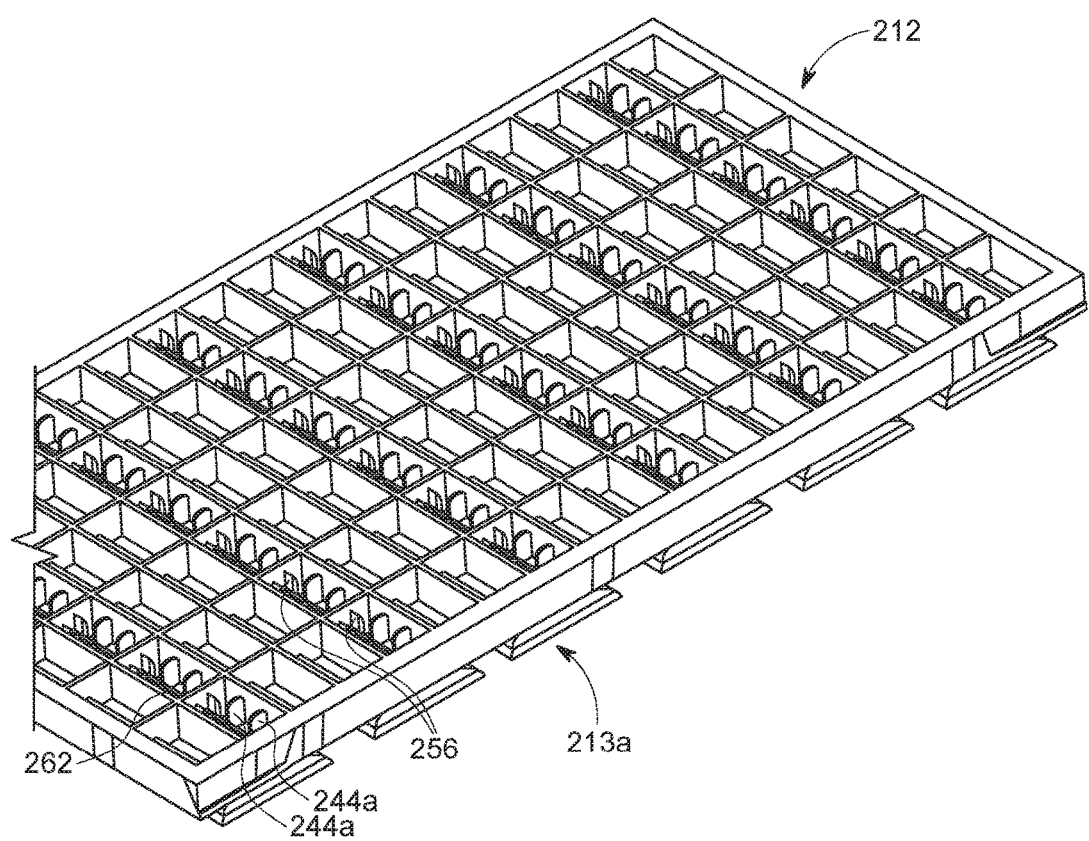
FIG. 19 is a perspective view of the bottom of the filter screen assembly of FIG. 17.

With reference to FIGS. 17-19, another configuration of a second screen frame 213a that may be used in conjunction with any of the screen assemblies and screen frames described herein, is shown. The second screen frame 213a may be substantially similar to the second screen frame 213, except as otherwise provided herein. The second screen frame 213a includes a divider 238a and a base 228a. The divider 238a may include a flange portion 246. The flange portion 246 extends from a proximal end 248 (proximate the divider 238) to a distal end 250, and includes first and second sidewalls 252a, 252b. First and second chamfered sidewalls 254a, 254b may extend between and connect the distal end 250 and the first and second sidewalk 252a, 252b, respectively. The first chamfered sidewall 254a may include at least one aperture 256 therethrough. The aperture 256 may be substantially perpendicular to the chamfered sidewall 252a, such that the aperture 256 extends through the second sidewall 252b. The flange portion 246 may further include a first slot 258 and a second slot 260. The first slot 258 may be substantially perpendicular to the second slot 260.

The base 228a of the second screen frame 213a includes at least one second tongue portion 244a. The second tongue portion 244a may be substantially similar to the tongue portion 244, except as otherwise provided herein. The second tongue portion 244a may include a channel or slot 262. The width W5 of the slot 262 may be less than a width W6 of the minor beam 224 of the first screen frame 212.

In an assembled configuration, the minor beam 224 may extend through the first slot 258 in the flange portion 246 and through the slot 262 in the second tongue portion 244a. The first main beams 216 may extend through the second slot 260 of the flange portion 246. A fastener 264, such as a screw, bolt, rivet or any other suitable mechanical fastener, may extend through the aperture 256. In one configuration, the screw 264 does not intersect the minor beam 224. While the second screen frame 213a is generally described herein as including the aperture 256 and the fastener 264, it will be appreciated that the fastener 264, such as a self-tapping screw, may create the aperture 256 described herein. The configuration of the aperture 256 perpendicular to the first chamfered sidewall 254a helps to ensure that a plane defined by the head of the fastener 264 is substantially parallel to a plane defined by the first chamfered sidewall 254a, such that the fastener 264 does not interfere with the flow of drilling mud through the cells 240. The configuration of the aperture 256 perpendicular to the first chamfered sidewall 254a also helps to ensure that the fastener 264 does not intersect any other portion of the first screen frame 212, including the minor beam 224, or otherwise interfere with, or cause any structural damage to, the first screen frame 212.

Figure 20:
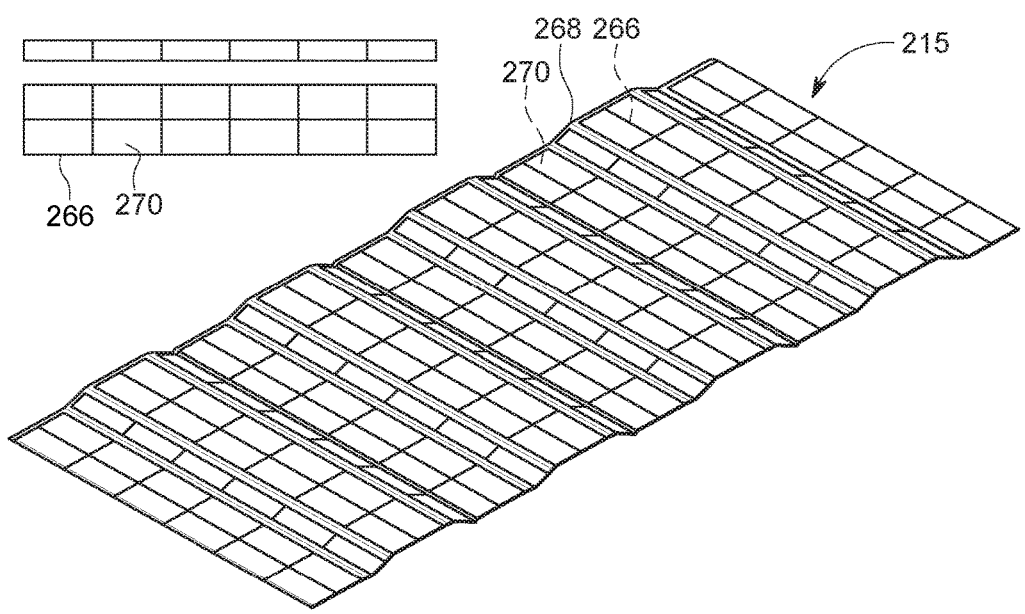
FIG. 20 is a perspective view of a screen assembly of a filter screen assembly, according to the principles of the present disclosure.

With reference to FIGS. 13 and 20, the screen assembly 215 may include a screen frame 266 and a screen 268. The screen frame 266 may be formed from metal (e.g., steel) or another suitable material. In one configuration, the screen frame 266 may be a stamped steel construct, defining an array or grid of cells 270. The size and shape of the cells 270 may correspond to the size and shape of the first and second cells 214a, 214b, the cells 214, and/or the cells 240. The screen 268 may be integrally formed with, or adjacent to the screen frame 266 and may be a mesh-like construct.

Figure 21:
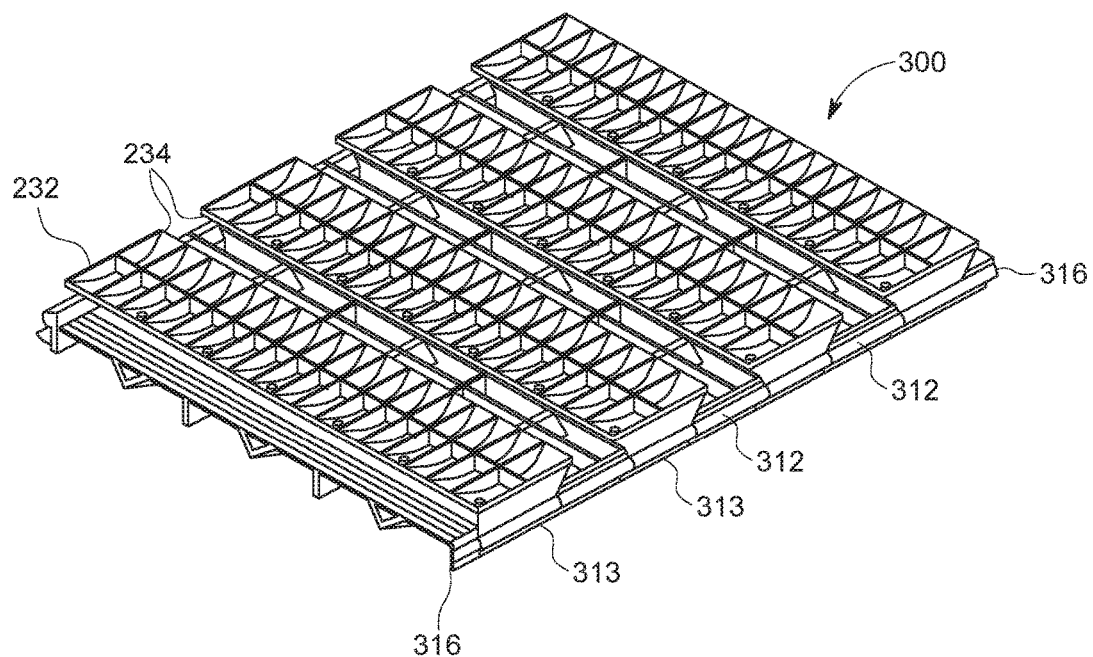
FIG. 21 is a perspective view of another configuration of a filter screen assembly, according to the principles of the present disclosure.
Figure 22:
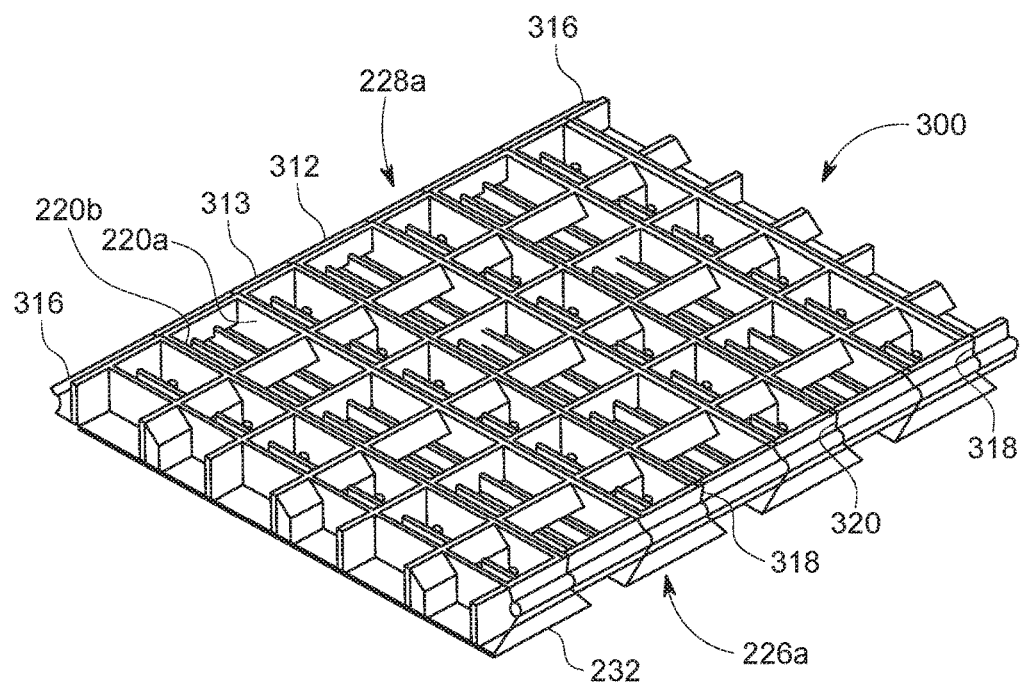
FIG. 22 is a perspective view of the bottom of the filter screen assembly of FIG. 21.

With reference to FIGS. 21 and 22, another configuration of a filtering screen assembly 300 includes a first screen frame 312, a second screen frame 313, a screen assembly 315, and a support piece 316. The first screen frame 312 may be substantially similar to the first screen frame 212, except as otherwise provided herein. The second screen frame 313 may be substantially similar to the second screen frame 213, except as otherwise provided herein. Accordingly, like reference numerals will be used to describe similar features.

The first screen frame 312 and the support piece 316 may each include at least one key 318, such as a dovetail element. The key 318 may extend along at least a portion of the first and second sidewalls 220a, 220b. The second screen frame 313 may include a slot 320 or other receiving portion. The slot 320 may extend along at least a portion of the base 228a of the second screen frame 313. The slot 320 may be sized and shaped to receive the key 318. In an assembled configuration, the key 318 may slid or otherwise locked into the slot 320 to mount the second screen frame 313 to the first screen frame 312 and/or the support piece 316. Accordingly, the filtering screen assembly 300 is generally described and shown as being a substantially modular assembly including various quantities, and an alternating pattern, of first and second screen frames 312, 313. It will also be appreciated that the filtering screen assembly 300, including the first and second screen frames 312, 313, may be a monolithic construct within the scope of the present teachings.

Figure 23:
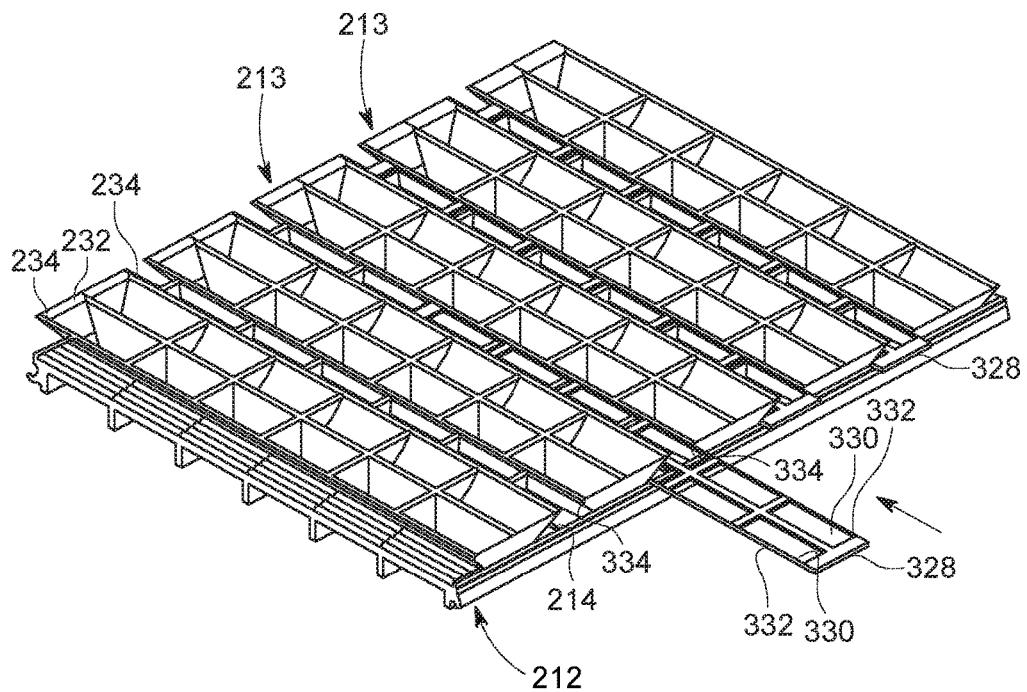
FIG. 23 is a perspective view of another configuration of a filter screen assembly, according to the principles of the present disclosure.

With reference to FIG. 23, the filtering screen assembly may also include a second screen frame 328. The second screen frame 328 may be used with any of the filtering screen assemblies described herein. The second screen frame 328 may define an array of cells 330. The size and shape of the cells 330 may be similar to the size and shape of the first and second cells 214a, 214b, such that the second screen frame 328 can be mounted or otherwise disposed adjacent the first screen frame 212, and between adjacent second screen frames 213. In this regard, the second screen frame 328 may include a key portion 332, such as a dovetail construct, and the second screen frames 213 may include a slot portion 334 sized and shaped to receive and secure the key portion 332 therein.

Figure 24:
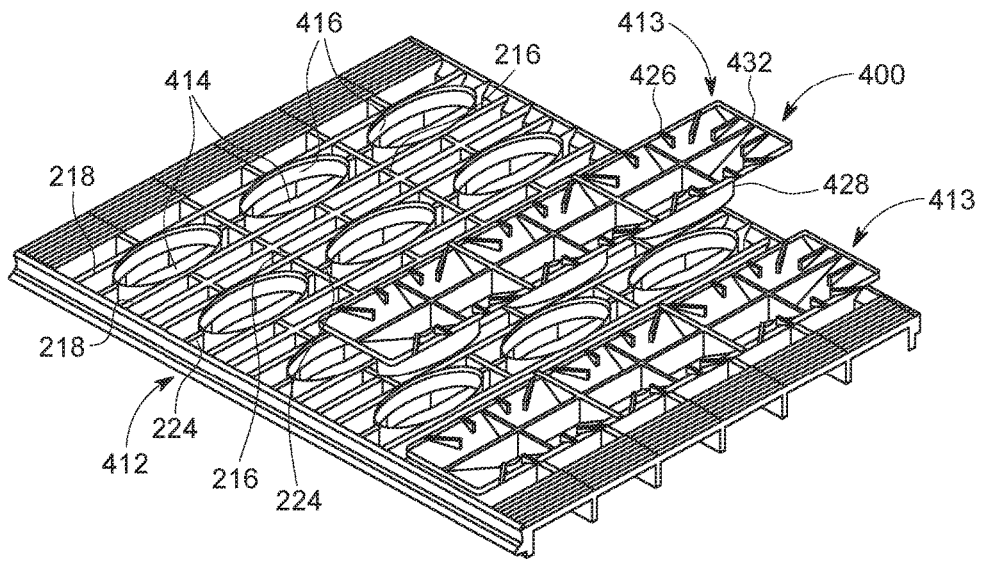
FIG. 24 is a perspective view of another configuration of a filter screen assembly, according to the principles of the present disclosure.
Figure 25:
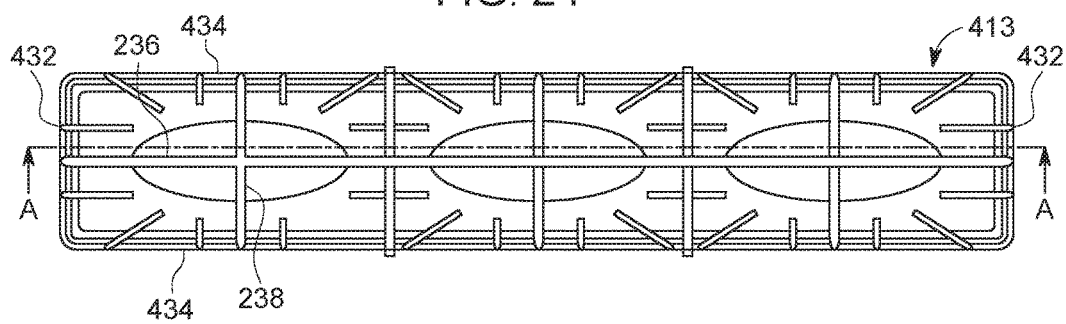
FIG. 25 is a top view of a second screen frame of the filter screen assembly of FIG. 24.
Figure 26:
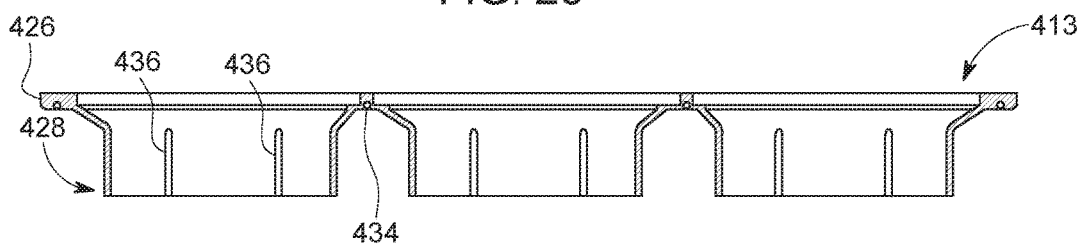
FIG. 26 is a side view of the second screen frame of FIG. 25.
Figure 27:
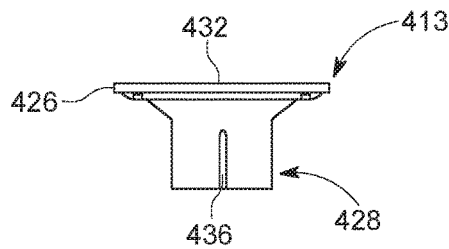
FIG. 27 is an end view of a second screen frame of FIG. 25.

With reference to FIG. 24, another configuration of a filtering screen assembly 400 includes a screen frame 412 and a second screen frame 413. The screen frame 412 may be substantially similar to the first screen frame 212, except as otherwise provided herein. The second screen frame 413 may be substantially similar to the second screen frame 213, except as otherwise provided herein. Accordingly, like reference numerals will be used to describe similar features.

The screen frame 412 includes at least one cell 414 defined by as wall 416. In one configuration, the cell 414 may have various shapes such as circular, multi-lobular, or triangular, within the scope of the present teachings. In one configuration, the cell 414 is substantially oval shaped having a major diameter and a minor diameter. The cell wall 416 may extend between adjacent second main beams 218. The minor diameter of the cell wall 416 may be substantially equal to the distance W4 between adjacent second main beams 218. The major diameter of the cell wall 216 may be less than the distance W2 between adjacent first main beams 216, such that the minor beam 224 extends between and connects the cell wall 416 and the first main beam 216. The screen frame 412 may include an array of cells 414. In one configuration, the array includes three cells 414 extending between the first and second sidewalk 220a, 220b, such that the major diameters of each cell 414 are substantially aligned. The screen frame 412 may include various quantities of arrays of cells 414.

With reference to FIGS. 24-27, the second screen frame 413 includes a frame 426 and a compression mechanism or base portion 428. The frame 426 may be defined by end walls 432 and sidewalk 434. The end walls 432 and the sidewalk 434 may be angled such that the frame 426 defines a funnel having a V-shape in the longitudinally extending direction and a V-shape in the laterally extending direction. It will also be appreciated that the end walls 432 and the sidewalls 434 may have other shapes and angles within the scope of the present disclosure, such that the end walls 432 and the sidewalls define a U-shaped funnel, a conical funnel, a pyramidal funnel, etc. The size and shape of the base portion 426 may be similar to the size and shape of the cell 414. Accordingly, in one configuration, the base portion 426 may be substantially oval shaped. The outer surface of the base portion 426 may include at least one radially extending flange or rib 436. As illustrated, the second screen frame 413 includes an array of base portions 426 that corresponds to the array of cells 414. Accordingly, in one configuration, the second screen frame 413 includes three base portions 426.

As illustrated in FIG. 24, in an assembled configuration, the base 426 of the second screen frame 413 may be removeably mounted within the cell 414 of the screen frame 412. The rib 436 of the base 426 may engage the cell wall 416 to provide a press or compression fit between the screen frame 412 and the second screen frame 413. In other configurations, the base 426 may be secured within the cell 414 by an adhesive, weld, mechanical fastener, or other suitable securing technique. The oval shape of the base 426 may improve the flow of drilling mud through the second screen frame 413, while the oval shape of the cell 414 improves the flow of drilling mud through the cells 214.

With continued reference to the figures, various methods of assembling the filtering screen assemblies will now be described in more detail. With particular reference to FIGS. 10 and 11, in one assembly method, the second screen frame 213 may be inserted into the first screen frame 212 such that the base 228 is received within the cell 214. A first portion of the screen assembly 215 may overlie the first screen frame 212 and a second portion of the screen assembly 215 may overlie the second screen frame 213, such that such that the screen frame 266 is substantially aligned with the first main beams 216, the second main beams 218, the minor beams 224, the main beam 236, and/or the divider.

Figure 28:
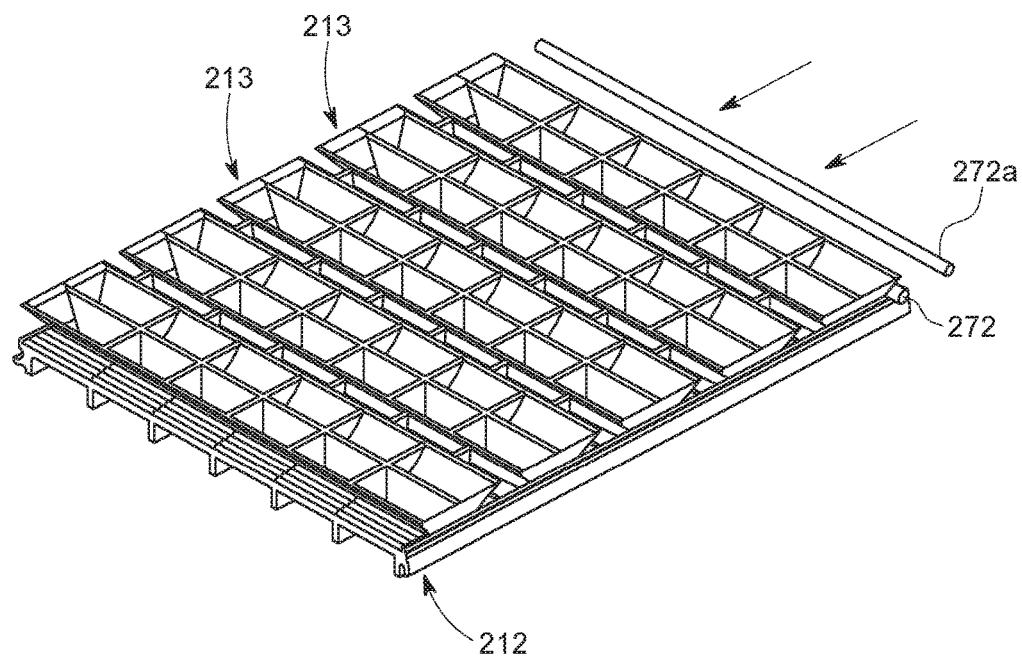
FIG. 28 is a perspective view of a filter screen assembly, including a pressing element, according to the principles of the present disclosure.

The screen assembly 215 may be fixed to at least one of the first screen frame 212 and the second screen frame 213 using adhesive, mechanical fasteners, or other suitable fastening technique. With reference to FIGS. 13 and 28, in one assembly method, the screen assembly 215 may be placed on the upper surface of the first screen frame 212 and the second screen frames 213, and a pressing element 272 may be rolled or otherwise moved over the first and second upper surfaces. In one configuration, the pressing element 272a may be a tube having a substantially triangular cross section, such that the corners of the pressing element 272a are received within the corners of the filtering screen assembly, to ensure proper adhesion of the screen 268 to the first screen frame 212 and the second screen frame 213. The pressing element 272 may include a heating element.

Figure 29:
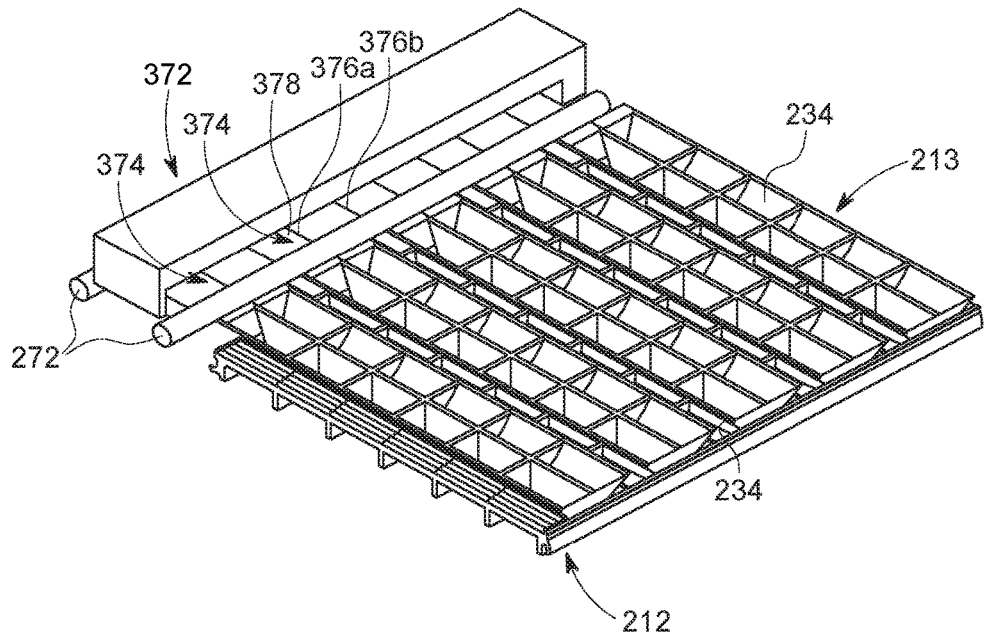
FIG. 29 is a perspective view of a filter screen assembly, including a heating element and a pressing element, according to the principles of the present disclosure.

With reference to FIG. 29, in another assembly method, a heating element 372 may include at least one flange portion 374. The size and shaped of the flange portion 374 may be similar to the size and shape of the space delineated by the first screen frame 212 and the sidewalls 234 of adjacent second screen frames 213. The flange portion 374 may include first and second sidewalls 376a, 376b and an end wall 378. As the flange portion 374 is received in the space between adjacent second screen frames 213, the first and second sidewalls 376a, 376 of the flange portion 374 may contact the sidewalls 234 of the second screen frame 213. Likewise, the end wall 378 of the flange portion 374 may contact the first screen frame 212. In this way, the flange portion 374 helps to ensure proper adhesion of the screen 268 to the first screen frame 212 and the second screen frames 213. At least one roller, such as pressing element 272 may be used in conjunction with heating element 372 to further ensure proper adhesion of the screen 68 to the first screen frame 212 and the second screen frames 213. In one configuration, two pressing elements 272 may be used in conjunction with the heating element 372. A first of the two pressing elements 272 may precede the heating element 372, and a second of the two pressing elements 272 may follow the heating element 372.

With particular reference to FIG. 23, the screen assembly 215, may be placed on and secured to the second upper surface of the second screen frames 213, using any of the methods described herein. A portion of the screen assembly 215 located between adjacent second screen frames 213 may then be removed (e.g., a cutout portion) from the screen assembly 215. The cutout portion of the screen assembly 215, or another portion of the screen assembly 215 may then be placed on and secured to a third upper surface of the second screen frame 228. The second screen frame 228, including the other portion of the screen assembly 215, may then be slid, or otherwise disposed on the first upper surface of the first screen frame 212 and between adjacent second screen frames 213, in the manner described herein. Accordingly, the first and second upper surfaces of the first screen frame 212 and the second screen frames 213 include a portion of the screen assembly 215 disposed thereon.

While embodiments described herein discuss "inserts" that may be positioned in or molded to a screen frame, one of ordinary skill in the art will appreciate that a screen frame in accordance with embodiments of the present disclosure may provide a two-tier (or multiple-tier) screening surface without providing inserts. In other words, a screen frame in accordance with the present disclosure may include two (or more) integrally formed screening surfaces. A screen frame may include a first tier and a second tier spaced apart from the first tier. For example, the first tier has a lower screen surface and the second tier has an upper screen surface. The first tier is positioned at a first height above the second tier. A mesh may be applied to the lower screen surface and the upper screen surface.

In some embodiments, a screen in accordance with embodiments disclosed herein may include a screen frame having a first screening surface and a second screening surface. The first screening surface is positioned at a first height above the screen frame. The second screening surface may be formed on the screen frame or may be positioned at a second height above the screen frame. The first screening surface is positioned above the second screening surface. A screening surface area of the first screening surface at the first height above the screen frame may be greater than an area of an opening of the screen frame below the first screening surface. If the second screening surface is positioned at a second height above the screen frame, then the screening surface area of the second screening surface may be greater than an area of an opening in the screen frame below the screening surface. Thus, the surface area of the first and second screening surfaces may be greater than the surface area formed between first and second sides and first and second ends of the screen frame. In some embodiments, the second screening surface may be flush with the screen frame. A mesh may be applied to the first and/or second screening surfaces. In some embodiments, the first and second screen surface may be planar. In other embodiments, one or both of the first and second screen surfaces may be angled or sloped.

Vibratory separators using, two-tier screen surfaces described herein may have a single screen deck in certain embodiments. Particularly, older vibratory separators may be retrofitted with two-tier screen surfaces described herein to increase the effective processing capacity. For example, shakers used on offshore platforms, where space on the rig floor is at a premium, may be retrofitted with the two-tier screen surfaces to increase the effective screening area. Likewise, the two-tier screen surfaces may be used on shakers located at land-based rigs. In other embodiments, vibratory separators using the two-tier screen surfaces may have multiple screening decks and multiple two-tier screen surfaces. In certain embodiments, the vibratory separator may include a first screening deck, such as a top screening deck, with a first two-tier screen, and a second screening deck, such as a bottom screening deck, with a second two-tier screen positioned beneath the top screening deck. Further, those of ordinary skill in the art will appreciate that other screening decks, such as a third and/or a fourth screening deck, may be included within the vibratory separator without departing from the scope of the present disclosure.

In some embodiments, a two-tier (or multi-tier) screen as disclosed herein may be positioned in a vibratory separator at or near the feed end of the separator while a single level or conventional screen is disposed proximate the discharge end of the separator. One of ordinary skill in the art will appreciate that, depending on the configuration of a given vibratory separator, one or more two-tier (or multi-tier) screens may be used in various positions on one or more decks off the vibratory separator. Embodiments of the present disclosure provide a shaker screen with an increased open screening area, and thus greater overall fluid capacity. The two-tier or two-tiered screening area may improve fluid capacity of the screen. For example, for a screen that has 5.5 square feet of non-blanked area, a two-tiered screen insert screen may increase the non-blanked area by 40% to 7.7 square feet or by 60% to 8.8 square feet. In a shaker with four screens, this would provide an increase of 8.8 square feet from 22 to 30.8 square feet or 13.2 square feet to 35.2 square feet. One of ordinary skill in the art will appreciate that the screening area of a screen with screen inserts as disclosed herein may increase by any other amount, including less than 40 percent, greater than 60 percent or between 40 and 60 percent based on the configuration of the screen inserts and the number of inserts installed in the screen. The horizontal screening surfaces (e.g., the first and second screen inserts) should have a higher effective screening area and allow more fluid to pass through, thereby providing increased effective processing capacity of the screen.

Although only a few example embodiments have been described in detail above those skilled in the art will readily appreciate that many modifications are possible in the example embodiments without materially departing from scope of the present application. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An apparatus comprising:
    a screen frame including:
        a first tier having a plurality of openings therethrough forming a first screen surface, wherein each opening is defined by main ribs and, optionally, minor ribs of the first tier, wherein the main ribs extend between sidewalls of the first tier; and
        a second tier having a frame and a base opposite with respect to the frame of the second tier, wherein a portion of the base of the second tier contacts the first tier such that the frame of the second tier extends outwardly away from the first tier, at least one beam and at least one divider of the frame define a grid of upper cells forming a second screen surface having a width defined between side edges of the second screen surface, first and second tongue portions of the base, extending outwardly away from the frame of the second tier, define a grid of lower cells adjacent the first tier, the first tongue portion extends from the at least one beam of the frame, the second tongue portion extends from the at least one divider of the frame, and the second screen surface is spaced apart from the first screen surface, and further wherein the width of the second screen surface is greater than a width of each opening of the plurality of openings of the first tier such that the width of the second screen surface overlaps at least two adjacent openings of the plurality of openings of the first tier when the portion of the base of the second tier contacts the first tier; and
    a mesh disposed on the first and second screen surfaces.

2. The apparatus of claim 1, wherein the second screen surface of the second tier is positioned at a height above the first screen surface of the first tier.

3. The apparatus of claim 1, wherein the width of the second screen surface overlaps at least three consecutive openings of the plurality of openings of the first tier when the portion of the base of the second tier contacts the first tier.

4. The apparatus of claim 1 wherein the mesh disposed on the first and second screen surfaces form a noncontiguous screening surface.

5. An apparatus comprising:
    a screen frame having a plurality of openings; and
    a first screen insert having a frame, with a width defined between side edges of the first screen insert and a height defined between a first surface and an opposite second surface of the first screen insert and a base opposite with respect to the frame of the first screen insert and extending outwardly away from the first surface of the first screen insert, wherein tongue portions of the base define a grid of lower cells adjacent to the screen frame such that the frame of the first screen insert extends outwardly away from the screen frame and the frame of the first screen insert has a screen surface, defined by beams of the frame and dividers of the frame, positioned at a first height above the plurality of openings of the screen frame, wherein the tongue portions of the base extend from the beams and the dividers of the frame and further wherein space is provided between the screen frame and the first surface of the first insert at the side edges of the first screen insert such that the space separates the screen frame from the first surface of the first screen insert at the side edges of the first screen insert.

6. The apparatus of claim 5, further comprising:
    a grid of upper cells defined by at least one main beam of the beams of the frame and at least one divider of the dividers of the frame of the first screen insert, wherein the grid of upper cells is adjacent to the screen surface of the first screen insert, the at least one main beam extends between end walls of the frame and the at least one divider extends between sidewalls of the frame.

7. The apparatus of claim 6, wherein the first screen insert and at least one second screen insert are disposed in adjacent openings of the screen frame.

8. The apparatus of claim 6, wherein a screen mesh covers a portion of the plurality of openings of the screen frame and the screen surface of the first screen insert, thereby forming a noncontiguous screening surface.

9. The apparatus of claim 6, wherein a width of the frame of the first screen insert is greater than a width of the base of the first screen insert.

10. The apparatus of claim 5, wherein the first screen insert is a modular unit comprising two or more individual first screen inserts coupled together.

11. The apparatus of claim 7, wherein the at least one second screen insert is a modular unit comprising two or more individual second screen inserts coupled together.

12. The apparatus of claim 7, wherein the first screen insert is coupled to the at least one second screen insert to form a modular unit.

13. The apparatus of claim 7, wherein at least one of the first screen insert and the at least one second screen insert comprises a dove-tail configuration which corresponds with a dove-tail slot formed in the screen frame.

14. The apparatus of claim 7, wherein the first screen insert and the at least one second screen insert are arranged in an alternating pattern along a length of the screen frame.

15. The apparatus of claim 7, further comprising one or more seals disposed between the first screen insert and the at least one second screen insert and the screen frame.

16. The apparatus of claim 7, wherein a first screen mesh size covers a first portion of the screen surface of the first screen insert and a second screen mesh size covers a second portion of a screen surface of the at least one second screen insert.

17. The apparatus of claim 5, further comprising:
    a second screen frame having an upper screen surface and a plurality of openings, the second screen frame disposed adjacent the screen frame; and
    a second screen insert disposed in a second opening of the plurality of openings of the second screen frame, the second screen insert having a screen surface positioned at a second height above the upper screen surface of the second screen frame.

18. The apparatus of claim 17, wherein at least a portion of the first screen insert disposed in the screen frame contacts at least a portion of the second screen insert disposed in the second screen frame.

19. The apparatus of claim 17, wherein a mesh is disposed on the first and second screen surfaces thereby forming a noncontiguous screening surface.

20. A method of processing a fluid, the method comprising:
    providing a flow of fluid to a vibratory separator; and
    flowing the fluid over the apparatus of claim 5.

21. The method of claim 20, wherein the apparatus further comprises a second screen insert positioned at a second height, the second height different from the first height.

22. The method of claim 21, further comprising adjusting a location of the second screen insert based on a flow rate of the fluid.

* * * * *